(12) United States Patent
Alba et al.

(10) Patent No.: US 8,812,396 B2
(45) Date of Patent: Aug. 19, 2014

(54) E-WALLET WITH CROSS-BORDER CAPABILITY

(71) Applicant: MasterCard International Incorporated, Purchase, NY (US)

(72) Inventors: Jose A. Alba, Long Island City, NY (US); Michael J. Shaon, Fayetteville, AR (US); Aimee G. Musil, O'Fallon, MO (US); Michael S. Ameiss, O'Fallon, MO (US); Eric R. Kitchen, O'Fallon, MO (US); David Pardo, Singapore (SG); Anand Shekaran, Singapore (SG)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 13/668,569

(22) Filed: Nov. 5, 2012

(65) Prior Publication Data

US 2013/0179340 A1 Jul. 11, 2013

Related U.S. Application Data

(60) Provisional application No. 61/584,382, filed on Jan. 9, 2012.

(51) Int. Cl.
*G06Q 40/00* (2012.01)

(52) U.S. Cl.
USPC ............................... 705/41; 705/26.1

(58) Field of Classification Search
CPC ........ G06Q 30/00; G06Q 30/06; G06Q 40/00
USPC ............ 705/26.9, 26.41, 26.43, 26.1
See application file for complete search history.

(56) References Cited

U.S. PATENT DOCUMENTS

| 6,636,833 | B1 | 10/2003 | Flitcroft |
| 7,136,835 | B1 | 11/2006 | Flitcroft |
| 2002/0062278 | A1* | 5/2002 | Ingram et al. ................... 705/39 |
| 2002/0120527 | A1* | 8/2002 | Lam et al. ...................... 705/26 |
| 2003/0018579 | A1 | 1/2003 | Litster |
| 2009/0037326 | A1 | 2/2009 | Chitti |

(Continued)

FOREIGN PATENT DOCUMENTS

WO    WO01/88805    11/2001

OTHER PUBLICATIONS

3-D Secure, downloaded from http://en.wikipedia.org/wiki/3-D_Secure on Sep. 29, 2011.

(Continued)

*Primary Examiner* — Jagdish Patel
(74) *Attorney, Agent, or Firm* — Otterstedt, Ellenbogen & Kammer, LLP

(57) ABSTRACT

Local shipping addresses in a first country are assigned to a plurality of consumers having physical addresses in at least one country other than the first country. A request is obtained, from an e-commerce retailer, for a corresponding one of the local shipping addresses. Product information, an indication of a desired form of shipping from the e-commerce retailer to the corresponding one of the local shipping addresses, and an indication of a desired form of shipping from the corresponding one of the local shipping addresses to a corresponding one of the physical addresses in the at least one country other than the first country are obtained. An indication of an estimated fully landed cost associated with the on-line shopping session is dispatched.

28 Claims, 15 Drawing Sheets

(56) References Cited

U.S. PATENT DOCUMENTS

| | | |
|---|---|---|
| 2009/0050686 A1 | 2/2009 | Kon |
| 2009/0119194 A1 | 5/2009 | Chau |
| 2009/0138379 A1* | 5/2009 | Scheman .................. 705/27 |
| 2009/0271282 A1 | 10/2009 | Pool |
| 2011/0289014 A1 | 11/2011 | Shroff |
| 2013/0218723 A1* | 8/2013 | Masud et al. ............. 705/26.62 |

OTHER PUBLICATIONS

PayPal, downloaded from http://en.wikipedia.org/wiki/Paypal on Sep. 29, 2011.
FIPS 140, downloaded from http://en.wikipedia.org/wiki/FIPS_140 on Oct. 21, 2011.
FiftyOne can help fast-track your global online expansion . . . , downloaded from http://www.fiftyone.com/ on Jul. 4, 2011.
Erica Harvill, MasterCard and Borderlinx Collaborate to Enhance E-Commerce Experience Around World, downloaded from http://www.mastercard.com/us/company/en/newsroom/pr_mc_borderlinx_collaborate.html on Jun. 28, 2011.
Borderlinx—create your own US and UK address and shop online, downloaded from https://www.borderlinx.com/m/ on Aug. 1, 2011.
Google Wallet—mobile app payments, downloaded from http://www.google.com/wallet/how-it-works-payments.html on Apr. 19, 2012.
Blaine R. Copenheaver, USPTO as ISA, International Search Report and Written Opinion for PCT Patent Application PCT/US2013/020679, Mar. 20, 2013.
David Pardo et al., Electronic Wallet Apparatus, Method, and Computer Program Product, unpublished U.S. Appl. No. 13/836,326, filed Mar. 15, 2013.

* cited by examiner

ACME

🛒 Your Info  Delivery Info  Payment  Review & Submit Order Complete

Payment Information

Choose your payment options below

Cost Summary
- Product Total: $1
- Sales Tax: $2
- Is this purchase tax exempt?  Order Total: $1

Payment Method
◉ Credit Card

EUREKA!                                    *Any Bank*

*Enter Your SecureCode* ™
Please enter your MasterCard SecureCode™ in the field below to confirm your identity for purchase. This information is not shared with the merchant.

| | |
|---|---|
| Merchant | Golf Shop |
| Amount | $250.00 |
| Date | 07-30-2002 |
| Card Number | xxxx-xxxx-xxxx-0071 |
| Personal Greeting | Hi Susan |
| SecureCode | [_____] |

Submit
Help  Cancel

Credit Card Type
[Select Card ▼]

Credit Card Number
[_____]

Expiration Date
[Mo ▼]  [Year ▼]       CID [____] What is This?

Billing Address
celine m - 2000 PURCHASE STREET        Add an Address | Edit this address

E-WALLET WITH CROSS-BORDER CAPABILITY

CROSS-REFERENCE TO RELATED APPLICATIONS

This patent application claims the benefit of U.S. Provisional Patent Application Ser. No. 61/584,382 filed on 9 Jan. 2012 and entitled "E-WALLET WITH CROSS-BORDER CAPABILITY." The complete disclosure of the aforementioned Provisional Patent Application Ser. No. 61/584,382 is expressly incorporated herein by reference in its entirety for all purposes.

FIELD OF THE INVENTION

The present invention relates generally to electronic commerce, and, more particularly, to electronic payment systems.

BACKGROUND OF THE INVENTION

With the growth of Internet commerce, the electronic wallet (e-wallet), also known as a digital wallet, has been developed. An e-wallet provides consumers with a secure and convenient way to pay for purchases from accepting on-line merchants. Upon registration, consumers may store their card, billing and shipping information on a site hosted by a suitable entity, and may access that information to pay conveniently and securely across participating merchants. The e-wallet platform may deliver additional security with the use of "virtual" account numbers to mask cardholders' real information.

Many foreign consumers now have a strong desire to shop overseas in the US and the UK. The US and UK are perceived as providing more options, better pricing, and a more pleasant experience in shopping. Many consumers go to the US on shopping sprees from all over the world.

In addition, broadband capability has been increasing around the world, often growing 150% on a yearly basis. There is also a stronger middle class in rapidly developing nations such as Brazil, India, China, and Russia. Consumers from these jurisdictions are finding their way to merchant web sites in the US and UK. 19% of all the browsing done on US e-merchants today is from consumers in other countries. However, US merchants for the most part do not accept foreign cards due to liability concerns. About 40% do accept foreign cards online; however, they accept foreign cards from only a handful of countries; say, 10-30 countries. Even when they do accept foreign cards, they typically do not ship overseas. Thus, there are barriers to both acceptance and fulfillment for foreigners wishing to purchase from US e-merchants.

Even for a US merchant that does ship all over the world, overseas shoppers have transparency issues as they may not be advised what taxes, customs duties, and the like will be due when the order arrives in their particular country; in some instances, they may not even be aware of the shipping charges.

SUMMARY OF THE INVENTION

Principles of the present invention provide techniques for an e-wallet with cross-border capability. An exemplary embodiment of a method (which can be computer-implemented), according to one aspect of the invention, of providing a secure on-line shopping experience at an e-commerce retailer located in a first country to a plurality of consumers in at least one country other than the first country, the consumers having physical addresses in the at least one country other than the first country, includes the steps of facilitating assigning to the plurality of consumers local shipping addresses in the first country; obtaining, at an electronic wallet server, in connection with an on-line shopping session of a given one of the consumers at the e-commerce retailer, a request, from the e-commerce retailer, for a corresponding one of the local shipping addresses assigned to the given one of the consumers; and supplying the corresponding one of the local shipping addresses to the e-commerce retailer in response to the request therefor. Further steps include obtaining, at the electronic wallet server, in connection with the on-line shopping session of the given one of the consumers at the e-commerce retailer, product information and an indication of a desired form of shipping from the e-commerce retailer to the corresponding one of the local shipping addresses; and obtaining, at the electronic wallet server, in connection with the on-line shopping session of the given one of the consumers at the e-commerce retailer, an indication of a desired form of shipping from the corresponding one of the local shipping addresses to a corresponding one of the physical addresses in the at least one country other than the first country. A further step includes dispatching, from the electronic wallet server, an indication, destined for the given one of the consumers, of an estimated fully landed cost associated with the on-line shopping session, the estimated fully landed cost being based at least upon the product information, the indication of the desired form of shipping from the e-commerce retailer to the corresponding one of the local shipping addresses, and the indication of the desired form of shipping from the corresponding one of the local shipping addresses to the corresponding one of the physical addresses in the at least one country other than the first country.

In another aspect, an electronic wallet server system for providing a secure on-line shopping experience at an e-commerce retailer located in a first country to a plurality of consumers in at least one country other than the first country, the consumers having physical addresses in the at least one country other than the first country, includes a memory; at least one processor operatively coupled to the memory; and a persistent storage device operatively coupled to the memory and storing in a non-transitory manner instructions which when loaded into the memory cause the at least one processor to be operative to carry out the method steps just described.

Aspects of the invention contemplate the method(s) performed by one or more entities herein, as well as facilitating of one or more method steps by the same or different entities. As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer product including a tangible computer readable recordable storage medium with computer usable program code for performing the method steps indicated stored thereon in a non-transitory manner. Furthermore, one or more embodiments of the invention or elements thereof can be implemented in the form of a system (or apparatus) including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a non-transitory manner in a tangible computer-readable recordable storage medium (or multiple such media) and implemented on a hardware processor, or (iii) a combination of (i) and (ii); any of (i)-(iii) implement the specific techniques set forth herein.

One or more embodiments of the invention can provide substantial beneficial technical effects, including, for example, Enhanced cross-border card acceptance with increased security—the consumer achieves enhanced security since the local funding card is, in a sense, almost like a virtual card—the merchant only "sees" the prepaid card and so there is less danger to the consumer of a fraudster obtaining information for the consumer's actual home-country card account—card data is obtained and stored securely and a unique code prevents use of the local funding card outside the system.

Rule-based set-up of prepaid cards in a plurality of countries during an initial registration process, thereby saving time and reducing the chance for data entry errors.

Fully landed cost estimate available seamlessly at checkout without toggling between web pages, thereby saving time and reducing the chance for errors.

These and other features and advantages of the present invention will become apparent from the following detailed description of illustrative embodiments thereof, which is to be read in connection with the accompanying drawings.

BRIEF DESCRIPTION OF THE DRAWINGS

FIGS. 3A-3C depict exemplary integration of a logistics company with an e-wallet, according to an aspect of the invention;

DETAILED DESCRIPTION OF PREFERRED EMBODIMENTS

Figure 1:
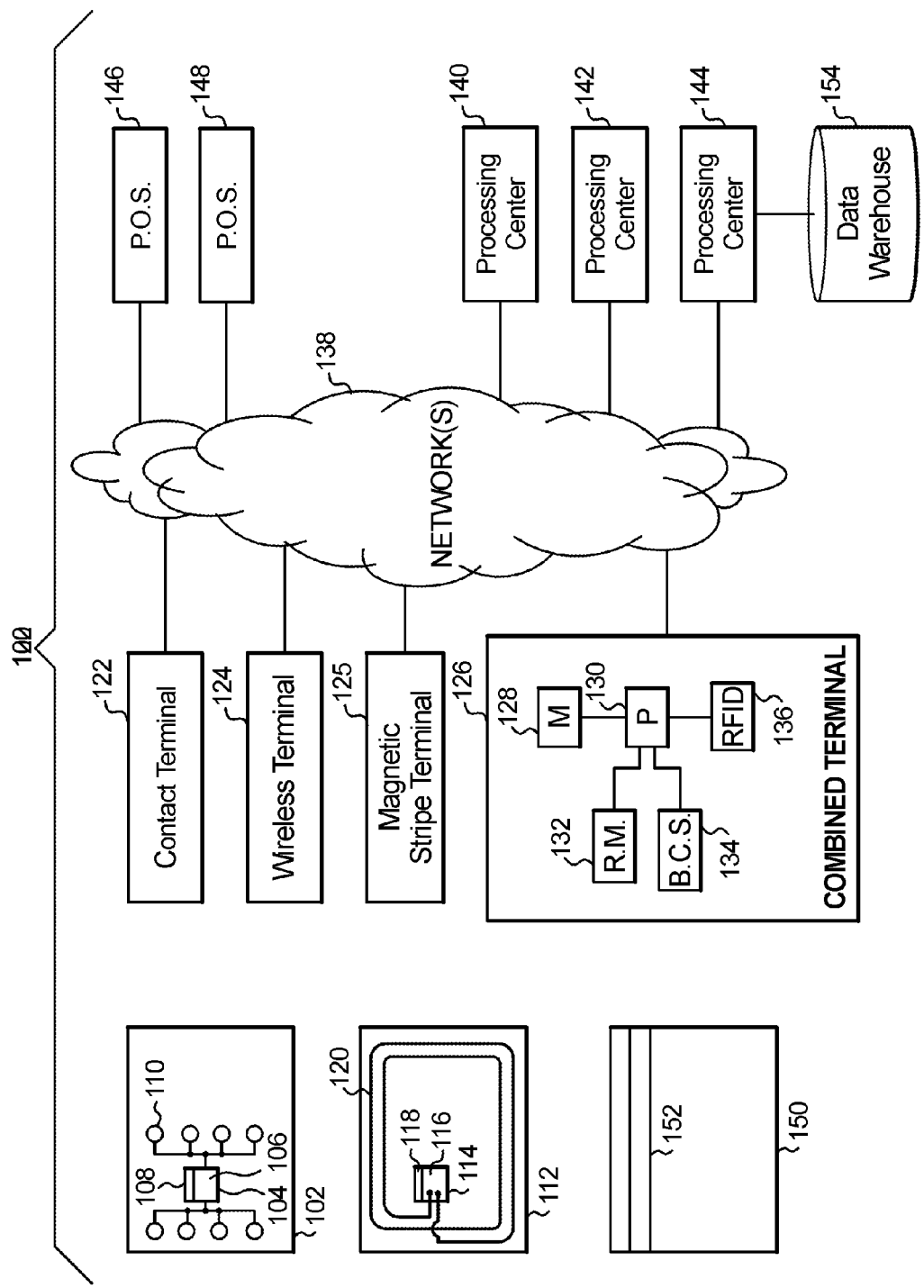
FIG. 1 shows a general example of a payment system that can implement techniques of the invention.

Attention should now be given to FIG. 1, which depicts an exemplary embodiment of a system 100, according to an aspect of the invention, and including various possible components of the system. It should be noted that purely for completeness and generality, presentation of physical cards to terminals will be described. However, one or more embodiments of the invention are particularly useful for card-not-present Internet commerce transactions. System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed. Other types of devices used in lieu of or in addition to "smart" or "chip" cards 102, 112 could include a conventional card 150 having a magnetic stripe 152, an appropriately configured cellular telephone handset, and the like. Indeed, techniques can be adapted to a variety of different types of cards, terminals, and other devices, configured, for example, according to a payment system standard (and/or specification).

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory. The memory units can store transaction card data such as, e.g., a user's primary account number ("PAN") and/or personal identification number ("PIN"). The memory portions or units 108, 118 can store the operating system of the cards 102, 112. The operating system loads and executes applications and provides file management or other basic card services to the applications. One operating system that can be used is the MULTOS® operating system licensed by MAOSCO Limited (MAOSCO Limited, St. Andrews House, The Links, Kelvin Close, Birchwood, Warrington, WA3 7PB, United Kingdom). Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications. At present, one possible specification to which such applications may conform is the EMV interoperable payments specification set forth by EMVCo, LLC (901 Metro Center Boulevard, Mailstop M3-3D, Foster City, Calif., 94404, USA). It will be appreciated that applications can be configured in a variety of different ways.

As noted, cards 102, 112 are examples of a variety of payment devices that can be employed. The primary function of the payment devices may not be payment, for example, they may be cellular phone handsets. Such devices could include cards having a conventional form factor, smaller or larger cards, cards of different shape, key fobs, personal digital assistants (PDAs), appropriately configured cell phone handsets, or indeed any device with the appropriate capabilities. In some cases, the cards, or other payment devices, can include body portions (e.g., laminated plastic layers of a payment card, case or cabinet of a PDA, chip packaging, and the like), memories 108, 118 associated with the body portions, and processors 106, 116 associated with the body portions and coupled to the memories. The memories 108, 118 can contain appropriate applications. The processors 106, 116 can be operative to execute one or more method steps. The applications can be, for example, application identifiers (AIDs) linked to software code in the form of firmware plus data in a card memory such as an electrically erasable programmable read-only memory (EEPROM). Again, note that "smart" or "chip" cards are not necessarily required and a conventional magnetic stripe card can be employed; furthermore, as noted above, one or more embodiments are of particular interest in the context of card-not-present Internet transactions.

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any type of device 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can be configured for contact communication with card or device 102, contactless communication with card or device 112, reading of magnetic stripe 152, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network (for example, a virtual private network, such as the BANKNET® virtual private network (VPN) of MasterCard International Incorporated of Purchase, N.Y., USA). More than one network could be employed to connect different elements of the system. More than one network could be employed to connect different elements of the system. For example, a local area network (LAN) could connect a terminal to a local server or other computer at a retail establishment. A payment network could connect acquirers and issuers. Further details regarding one specific form of payment network will be provided below. Processing centers 140, 142, 144 can include, for example, a host computer of an issuer of a payment device (or processing functionality of other entities discussed in other figures herein).

Many different retail or other establishments, as well as other entities, generally represented by points-of-sale 146, 148, can be connected to network 138. Different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

The portable device can include a body portion. For example, this could be a laminated plastic body (as discussed above) in the case of "smart" or "chip" cards 102, 112, or the handset chassis and body in the case of a cellular telephone.

Again, conventional magnetic stripe cards 150 can be used instead of or together with "smart" or "chip" cards, and again, cards and other payment devices are described for completeness, as one or more embodiments are of particular interest in the context of card-not-present Internet transactions.

It will be appreciated that the terminals 122, 124, 125, 126 are examples of terminal apparatuses for interacting with a payment device of a holder. The apparatus can include a processor such as processor 130, a memory such as memory 128 that is coupled to the processor, and a communications module such as 132 that is coupled to the processor and configured to interface with the portable apparatuses 102, 112, 142. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. The aforementioned bar code scanner 134 and/or RFID tag reader 136 can be provided, and can be coupled to the processor, to gather attribute data, such as a product identification, from a UPC code or RFID tag on a product to be purchased.

The above-described devices 102, 112 can be ISO 7816-compliant contact cards or devices or NFC (Near Field Communications) or ISO 14443-compliant proximity cards or devices. In operation, card 112 can be touched or tapped on the terminal 124 or 128, which then contactlessly transmits the electronic data to the proximity IC chip in the card 112 or other wireless device. Magnetic stripe cards can be swiped in a well-known manner. Again, in one or more instances, the card number is simply provided via web site, in a card-not-present transaction, or the like.

One or more of the processing centers 140, 142, 144 can include a database such as a data warehouse 154.

As mentioned several times, one or more embodiments are of particular interest in the context of card-not-present Internet transactions. In such cases, the card or other device is not presented to terminal 122, 124, 125, or 126. Rather, appropriate card information (e.g., primary account number (PAN), cardholder name, cardholder address, expiration date, and/or security code, and so on) is provided to a merchant by a consumer using a web site or the like. The merchant then uses this information to initiate the authorization process. One or more embodiments employ an e-wallet in connection with card-not-present transactions.

Figure 2:
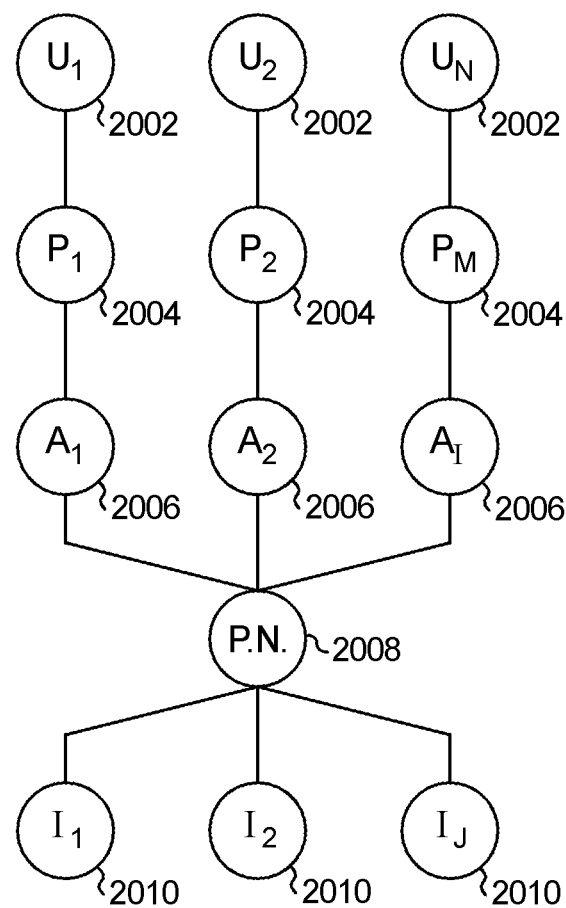
FIG. 2 depicts an exemplary inter-relationship between and among: (i) a payment network configured to facilitate transactions between multiple issuers and multiple acquirers, (ii) a plurality of users, (iii) a plurality of merchants, (iv) a plurality of acquirers, and (v) a plurality of issuers.

With reference to FIG. 2, an exemplary relationship among multiple entities is depicted. A number of different users (e.g., consumers such as on-line shoppers) 2002, $U_1, U_2 \ldots U_N$, interact with a number of different merchants 2004, $P_1, P_2 \ldots P_M$. Merchants 2004 interact with a number of different acquirers 2006, $A_1, A_2 \ldots A_I$.

Acquirers 2006 interact with a number of different issuers 2010, $I_1, I_2 \ldots I_J$, through, for example, a single operator 2008 of a payment network configured to facilitate transactions between multiple issuers and multiple acquirers; for example, MasterCard International Incorporated, operator of the BANKNET® network, or Visa International Service Association, operator of the VISANET® network. In general, N, M, I, and J are integers that can be equal or not equal.

During a conventional credit authorization process, the cardholder 2002 pays for the purchase and the merchant 2004 submits the transaction to the acquirer (acquiring bank) 2006. During Internet commerce, for example, the cardholder may simply provide the card number, expiration date, security code, and/or other pieces of data described above to the merchant, who prepares an authorization request based upon same without actually seeing the physical card. The acquirer verifies the card number, the transaction type and the amount with the issuer 2010 and reserves that amount of the cardholder's credit limit for the merchant. At this point, the authorization request and response have been exchanged, typically in real time. Authorized transactions are stored in "batches," which are sent to the acquirer 2006. During subsequent clearing and settlement, the acquirer sends the batch transactions through the credit card association, which debits the issuers 2010 for payment and credits the acquirer 2006. Once the acquirer 2006 has been paid, the acquirer 2006 pays the merchant 2004.

It will be appreciated that the network 2008 shown in FIG. 2 is an example of a payment network configured to facilitate transactions between multiple issuers and multiple acquirers, which may be thought of as an "open" system. A wide variety of other types of payment networks can be used. For example, some embodiments of the invention may be employed with proprietary or closed payments networks with only a single issuer and acquirer; with mobile networks; and/or with various types of electronic wallet services in conjunction with a suitable payment network.

One or more embodiments of the invention advantageously work in conjunction with an electronic wallet (e-wallet), also known as a digital wallet. As noted above, an e-wallet provides consumers with a secure and convenient way to pay for purchases from accepting on-line merchants. Upon registration, consumers may store their card, billing and shipping information on a site hosted by a suitable entity (for example, an operator of a payment network 2008), and may access that information to pay conveniently and securely across participating merchants. The e-wallet platform may deliver additional security with the use of "virtual" account numbers to mask cardholders' real information.

Figure 5:
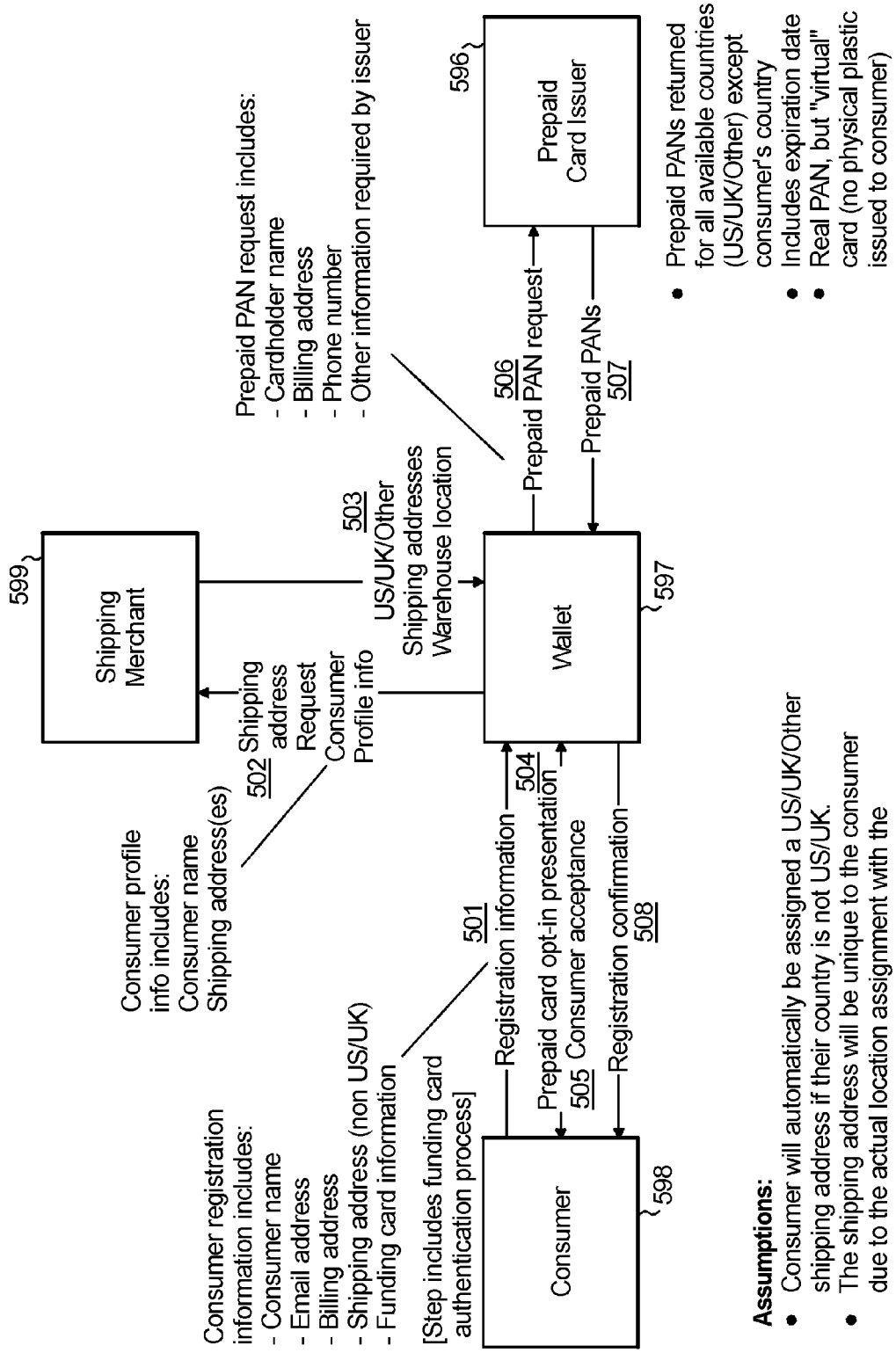
FIG. 5 depicts an exemplary e-wallet registration flow, with pre-paid card provisioning, according to an aspect of the invention.

In a presently preferred approach, a "permanent" prepaid PAN is assigned as explained with respect to FIG. 5 and accompanying text; the merchant "sees" this prepaid PAN, and the wallet maps this to the funding account in the home country for funding purposes. Alternatively, the aforementioned use of "virtual" account numbers, also known as PAN mapping, can be, for example, a network service that an operator of a payment network 2008 (e.g., an entity such as MasterCard International Incorporated) provides to issuers; in other instances, issuers may elect to use their own solution. The PAN mapping process involves taking the original Primary Account Number (PAN) and issuing a pseudo-PAN (or virtual card number) in its place. This provides security against the possibility of the original PAN becoming compromised. A non-limiting example of PAN mapping is that offered under the "one time use number" feature of MasterCard International Incorporated's in Control™ payment solutions platform. The skilled artisan will be familiar with a variety of PAN mapping techniques, and, given the teachings herein, will be able to adapt same to one or more embodiments of the invention. For example, the payment network operator may create a translation table wherein external-facing instances of the number present the pseudo-PAN while internal-facing instances present the actual PAN. Commercially available PAN-mapping solutions which may be adapted to embodiments of the invention, given the teachings herein, include those available from Orbiscom Ltd., Block 1, Blackrock Business Park, Carysfort Avenue, Blackrock, Co. Dublin, Ireland (now part of MasterCard International Incorporated of Purchase, N.Y., USA); by way of example and not limitation, techniques of U.S. Pat. Nos. 6,636,833 and 7,136,835 of Flitcroft et al. The skilled artisan will be familiar with the techniques disclosed in the aforementioned U.S. Pat. Nos. 6,636,833 and 7,136,835 of Flitcroft et al., and, given the teachings herein, will be able to modify same to implement one or more embodiments of the invention. Nevertheless, out of an abundance of caution, the complete disclosures of both of the aforementioned U.S. Pat. Nos. 6,636,833 and 7,136,835 of Flitcroft et al. are expressly incorporated herein by reference in their entireties for all purposes.

For the avoidance of doubt, it is to be emphasized that MasterCard International Incorporated's in Control™ payment solutions platform is a non-limiting example, and many different techniques can be used to provide the "virtual number" described elsewhere herein, whether PAN mapping as described in the Flitcroft et al. patents or otherwise.

In one or more embodiments, merchants that participate in the e-wallet service will have to register with a suitable entity (for example, an operator of a payment network 2008) to receive a digital certificate, used when integrating their e-commerce services with an e-wallet platform over a mutually authenticated secure socket layer (SSL) connection.

When a shopper selects the e-wallet option on a participating merchant's site, the merchant site will pass a variety of transaction information, (e.g., merchant name, merchant return link, session ID) to the e-wallet platform. After the consumer logs into the e-wallet platform using his or her ID and password, and selects his or her payment and shipping options, the e-wallet platform passes payment details back to the merchant (e.g., the virtual card number (VCN) or real card number (RCN), expiration date, shopper name and contact information, ship-to details, and so on). The merchant may then present the final transaction details for confirmation before submitting the transaction for authorization and clearing.

It should be noted that the person of ordinary skill in the art will be familiar with e-wallets per se, and, given the teachings herein, will be able to adapt same for implementing one or more embodiments of the invention. Non-limiting examples of known e-wallets include the PayPal service (mark of PayPal subsidiary of eBay, Inc., San Jose, Calif., USA); the Checkout by Amazon service (mark of Amazon.com, Inc., Seattle, Wash., USA); and the Google Checkout service (mark of Google, Inc. Mountain View, Calif., USA).

One or more embodiments are advantageously employed as part of, or in conjunction with, an e-commerce and mobile (E&M) wallet. The E&M wallet works by providing consumers an authentication platform so they can securely perform a transaction at merchants that accept the E&M wallet. One or more embodiments advantageously "flatten the world" across borders for the consumers.

In this regard, as noted above, many foreign consumers now have a strong desire to shop overseas in the US and the UK. The US and UK are generally perceived as providing more options, better pricing, and a more pleasant experience in shopping. Many consumers go to the US on shopping sprees from all over the world.

Furthermore, as also noted above, broadband capability has been increasing around the world, often growing 150% on a yearly basis. There is also a stronger middle class in rapidly developing countries such as Brazil, India, China, and Russia. Consumers are finding their way to merchant web sites in the US and UK. 19% of all the browsing done on US e-merchants today is from consumers in other countries. However, US merchants for the most part do not accept foreign cards due to liability concerns. About 40% do accept foreign cards online; however, they accept foreign cards from only a handful of countries; say, 10-30 countries. Even when they do accept foreign cards, they typically do not ship overseas. Thus, there are barriers to both acceptance and fulfillment for foreigners wishing to purchase from US e-merchants.

Yet further, as also noted above, even for a US merchant that ships all over the world, overseas shoppers have transparency issues as they may not be advised what taxes, customs duties, and the like will be due when the order arrives in their particular country; in some instances, they may not even be aware of the shipping charges.

One or more embodiments advantageously overcome these tangible barriers, which have heretofore hindered foreign consumers from taking full advantage of US and UK e-commerce web sites. Furthermore, one or more embodiments advantageously allow US and UK e-merchants to overcome these barriers, so that they can safely reach out to overseas consumers. In this regard, the US and UK are used as non-limiting examples of jurisdictions in which e-shopping may be desirable, and "foreign" jurisdictions, i.e., non-US or UK, are used as non-limiting examples of jurisdictions in which consumers may wish to access e-commerce sites outside their borders. Thus, one or more embodiments are generally applicable to shoppers foreign to one or more shopping jurisdictions accessing e-commerce sites associated with the one or more shopping jurisdictions.

One or more embodiments are implemented as part of the above-mentioned E&M wallet, and advantageously reduce or eliminate the barriers that exist today by providing consumers with a unique experience when they are shopping.

It is worth noting that currently, the above-mentioned barriers are being addressed in a relatively basic fashion. One or more existing entities address acceptance issues, transparency, decline, fraud concerns, shipping, warranty, and related issues, by having consumers sign up for their services to obtain a local address in the US or UK. When the consumer shops in an on-line merchant in these countries, upon checkout, the consumer enters the local address and the merchant provides ordinary local shipping. The consumer can use his or her payment card from his or her home country; if the same is not accepted, a so-called concierge service is provided. The merchant ships to an address in the same country as the merchant and the consumer manages his or her shipping from there.

When the consumer desires to know the fully landed cost of an item, one or more of such existing entities provides a shipping calculator. Say, for example, that the consumer likes a particular pair of jeans. He or she goes to the entity's (not merchants) site, opens the calculator, enters a product description, and the entity returns a fully landed cost, including tax, customs duties, and shipping costs. The consumer has control of the decision as to whether to buy, but the process requires toggling back and forth to the entity's web site; it is not directly connected to the merchant check-out experience. If the merchant will not accept the consumer's payment card, the entity can provide the aforementioned concierge service. The concierge service involves the entity buying on behalf of the consumer. Say that the overseas customer tries to check out at the web site of the US e-merchant but the transaction is declined because the merchant does not accept the overseas-origin card. In such a case, the overseas consumer can toggle back to the entity's web site and fill out a form with the product description, web site, and so on. The entity buys the desired merchandise for the consumer with a US card, with the entity functioning as the consumer; the entity has the merchandise shipped to the US address, and the entity charges the consumer for the full amount.

The process just described bypasses the acceptance issue and provides a neat but fairly basic way to eliminate the barriers.

One or more embodiments advantageously address the issues of acceptance, cost transparency, decline, fraud, and other barriers faced by overseas consumers and solve them right at the checkout page of the merchant (in some cases, without having to integrate the merchant any more than is already required for e-wallet integration), while providing the consumer with instant, on-the-fly, elimination of the aforementioned barriers, for a (preferably completely) transparent experience.

Figure 3A:
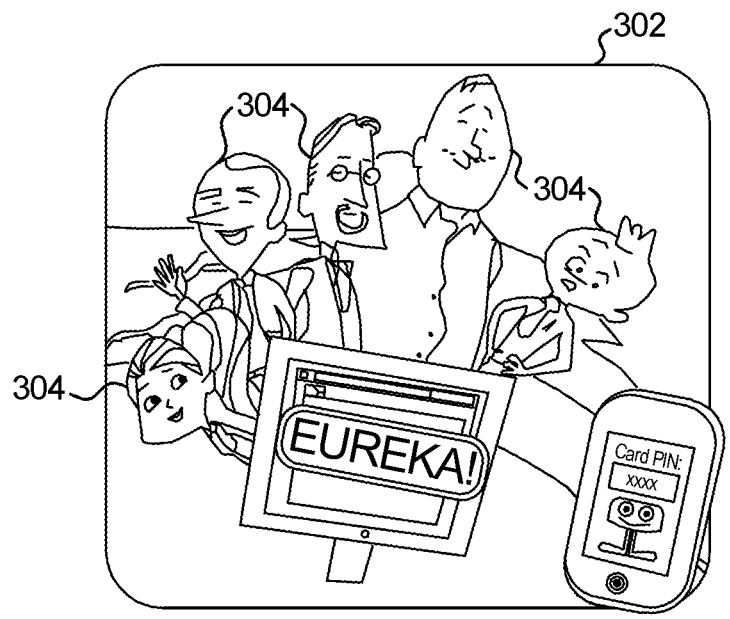
Figure 3C:
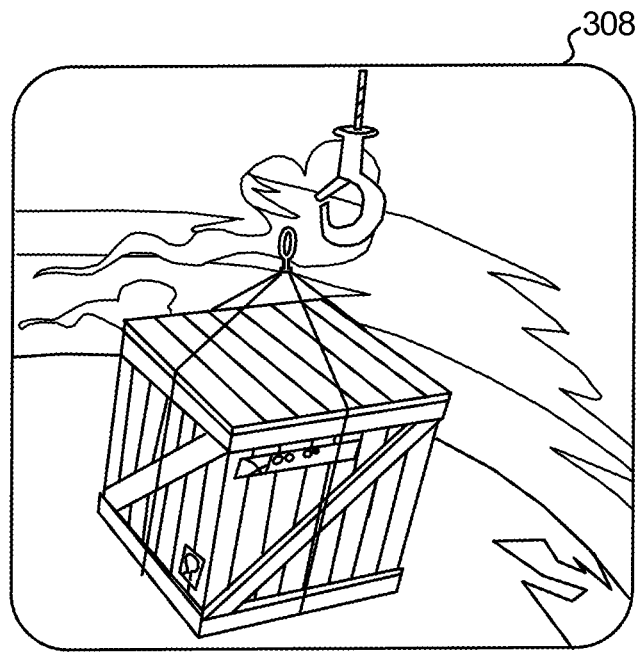

Reference should now be had to FIGS. 3A-3C. FIGS. 3A-3C depict exemplary integration of a logistics company with an e-wallet, according to an aspect of the invention. The consumer journey and the underlying technology will both be described. As indicated at 302, one or more consumers 304 have registered for the e-wallet. The given consumer automatically receives an address in the countries that will be serviced, e.g., the US and the UK, but this can be expanded to any desired jurisdiction, e.g., China, Singapore, Japan, Malaysia, and France; any jurisdiction that people desire to purchase from. There are approximately 56 countries today that people can shop from. The number of such countries is expected to continue to grow.

At 302, when consumers 304 sign up for the e-wallet, they automatically are provided with the local addresses; access to a web shopping mall such as MASTERCARD MARKET-PLACE (mark of MasterCard International Incorporated, Purchase, N.Y., USA); discounting and promotion sites all over the world, such as those that may be provided by an operator of payment network 2008; and local virtual cards for each country where they can shop—for example, a US and UK virtual card (as used herein, a virtual account is a payment card account that does not have a physical card associated with it, but in all other respects acts like a regular account). Not every feature need necessarily be provided in every embodiment. Note that advantageously, in one or more embodiments, the consumer does not need to know the details of the local addresses and virtual cards.

In particular, the consumer does not need to know, memorize, or even have the addresses and account numbers displayed to him or her. He or she is simply advised that now he or she can shop in any of the indicated countries, securely and anonymously, and the service provider, such as an operator of network 2008, will handle the details for the consumer.

At 306, the consumer is shopping at a web site in a jurisdiction of interest, say, the US or UK, depicted as the "ACME" web site. For the sake of argument, say that the consumer is in Mexico and is shopping for jeans in the US at the "ACME" web site. He or she puts the jeans in his or her checkout cart and hits checkout. As part of the checkout, the merchant places the pair of jeans into the e-wallet so that the e-wallet can show the jeans for checkout. The e-wallet taps into a suitable calculator; for example, one provided by a suitable logistics partner (a non-limiting example of a potential logistics partner is Borderlinx Europe SA) and shows the consumer the estimated fully landed cost (for example, the logistics partner has an API into the customs facilities in the consumer's jurisdiction so if the merchant provides the item description as part of the checkout process; the fully landed cost includes the total cost from the e-commerce retailer (merchandise and domestic shipping and tax) plus the international shipping and the customs duties) of the pair of jeans into Mexico in Mexican pesos. The consumer can decide on the spot whether he or she is happy with the cost. When the consumer checks out, the e-wallet form-fills for the merchant, using the local US address of the consumer. The wallet also provides the virtual US card information to the merchant, after first accessing an original payment card that the consumer previously registered during the sign-up process. The required funds are drawn from the original payment card. Thus, the consumer is in Mexico but is effectively paying the merchant with a US virtual card with a US address in a manner that is completely transparent to the merchant. The consumer knows that the account will be accepted everywhere in the US because the US merchant always "sees" a US virtual card with a US address. The consumer knows the estimated fully-landed cost.

Note that the example of an e-wallet working with a logistics partner is non-limiting, and in other cases, a single entity could perform all method steps or provide all apparatus components, or there could be multiple entities breaking up the tasks to be performed in a different way than as described here.

At 308, the consumer manages his or her international shipping, using a shipping interface in the e-wallet. Say, the consumer has three boxes in the US, two in the UK, and one in Japan from previous purchases. The consumer can decide when he or she wants the boxes shipped to his or her country. Behind the scenes, a logistics partner or other entity is actually managing the logistics.

One or more embodiments thus provide a solution which "flattens the world" for the consumer in a way that is convenient, secure, and anonymous, while enabling behind-the-scenes connection of assets, capabilities, and partnerships (for example, those of an operator of a payment network 2008), in order to provide the consumer with the desired experience. Some embodiments include an integration or connection with a logistics partner's capabilities and logistics, such as the calculator that handles the customs information for all the countries, as well as virtual cart automatic top-up functionality, wherein the virtual cart, which fronts all the transactions, automatically accesses the registered (home country) card, obtains the funds, and passes the funds on to the merchant via the virtual card account in the country of the merchant, thus fronting the transaction on behalf of the merchant. In some instances, MASTERCARD Integrated Processing Solutions (IPS) debit processing platform carries out processing on behalf of the pre-paid issuer and also manages top-up of the pre-paid card. Thus, top-up could be handled by a logistics partner, by the operator of a payment network, by another entity working in partnership with the payment network, or in a variety of other fashions.

One or more embodiments thus provide one or more unique features. For example, as noted, in one or more embodiments, the consumer has the shopping experience right at check-out, in the sense of automatically drawing funds from the main (home country) account. Another unique aspect is the wallet showing the fully landed cost in the consumer's own currency without the need to access an external web site. Yet another unique aspect involves the e-wallet form-filling using the local address; the fronting of a local virtual card to automatically withdraw the funds is also unique. Further, in some cases, one or more embodiments advantageously are implemented without the need for any merchant integration beyond what is already implemented in the e-wallet. In other cases, merchants do perform additional tasks, such as providing automated product descriptions and/or costs.

It is worth noting that currently, FiftyOne, Inc., 8 W. 40th Street, 5th Floor, New York, N.Y. 10018 provides merchants with a somewhat similar experience in that they ship overseas. FiftyOne integrates with the merchant's inventory to provide a fully landed cost, and then they ship directly to the consumer's country and charge the consumer's card directly. FiftyOne provides a fully-landed cost upon checkout but they do not provide form filling or a virtual card; if the consumer's main card is not accepted, the transaction will not be successful.

Thus, by way of review, one or more embodiments advantageously set up a virtual pre-paid account with the wallet registration, which is transparent to the user, and/or provide functionality such that, at the time of the transaction, the e-wallet recognizes it is a cross-border transaction and utilizes the virtual account instead of the regular home-country card. Further, one or more embodiments also form-fill for the consumer using the local address provided for the particular country he or she is shopping in).

Still with reference to FIGS. 3A-3C, "behind the scenes" aspects will now be discussed. At 302, the e-wallet terms and conditions preferably include cross-border services, including enrollment for the virtual pre-paid card and enrollment for the aforementioned web shopping mall or the like. The e-wallet preferably transfers the enrollment data to a logistics partner and the aforementioned web shopping mall or the like.

Furthermore, a virtual pre-paid card is issued in the US, UK, or other jurisdiction the consumer 304 desires to shop in. Note that the virtual card is not limited to a pre-paid card; note further that in many instances, the virtual card is implemented in a "cardless" account as an account number only without a physical card. Furthermore, at 306, the e-wallet connects the logistics partner's calculator to show the landed costs, the local virtual pre-paid card data is passed to the merchant via a suitable technique, and the local virtual pre-paid card is mapped back to the original funding card for processing. In some instances, a suitable technique includes use of the aforementioned MasterCard in Control™ feature, wherein parents, employers or cardholders are able to establish parameters for when, where and how their cards are used, giving them more control over their accounts and adding extra value to their relationship with their financial institution. Please note that the MasterCard in Control™ feature is a non-limiting example of a suitable technique. Please refer to the Flitcroft patents for non-limiting exemplary details on mapping of account numbers. Finally, at 308, the e-wallet interface preferably includes a tab for consumers to manage their shipping. Note that in some instances, the services of a logistics partner are "white-labeled" and the consumer is unaware that any entity other than the payment network operator is involved. In other cases, the logistics partner can be mentioned.

Figure 4:
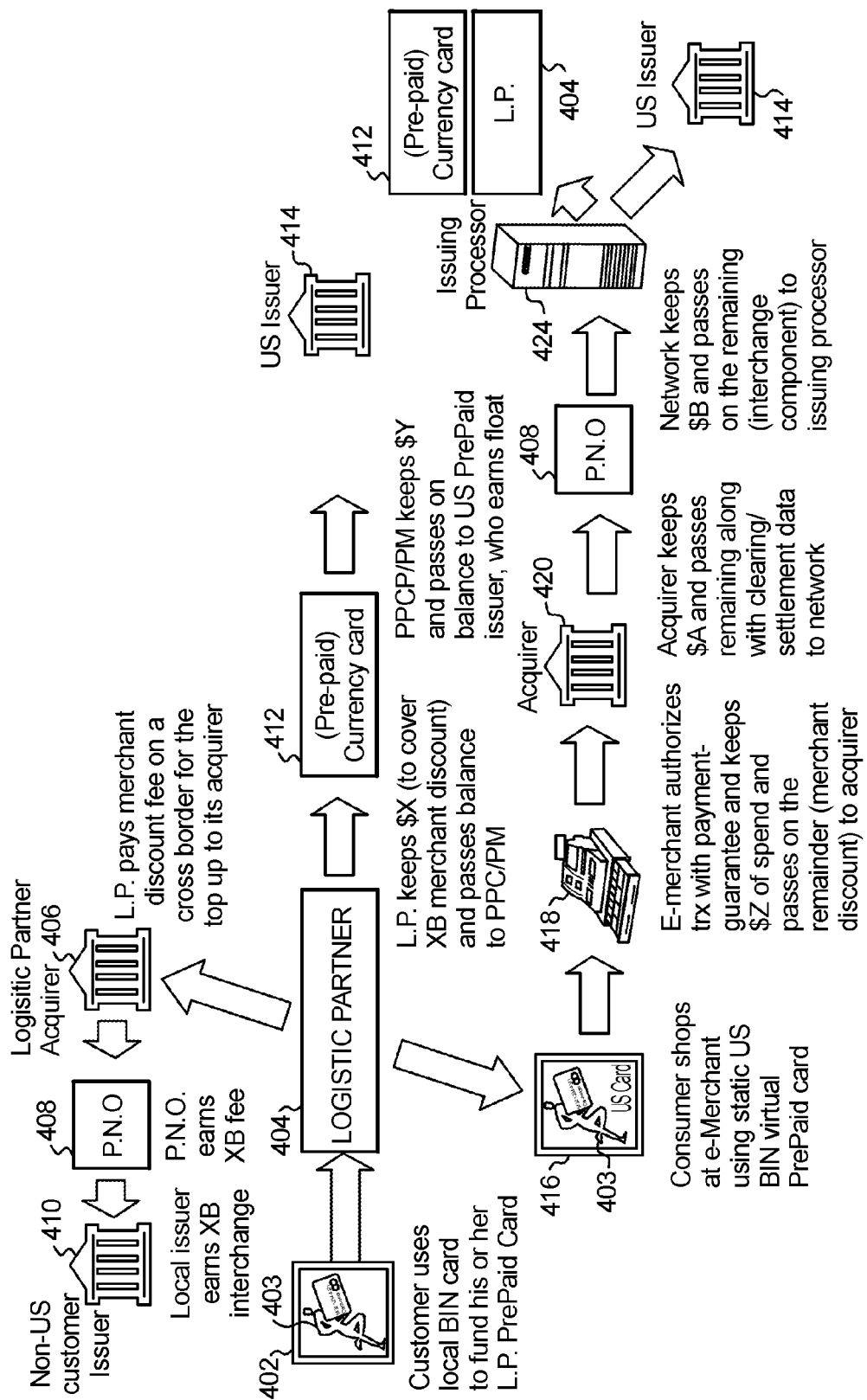
FIG. 4 depicts an exemplary co-branded prepaid transaction flow, according to an aspect of the invention.

FIG. 4 depicts an exemplary co-branded prepaid transaction flow. At 402, the customer 403 uses a local bank identification number (BIN) card (i.e., local to his or her jurisdiction and foreign to the jurisdiction he or she desires to shop in) to fund his or her virtual pre-paid card with a logistics partner 404. The logistics partner 404 pays a merchant discount fee on a cross-border transaction for the top-up to the logistics partner's acquirer 406. The payment network operator 408 (e.g. an entity such as 2008) earns a cross-border (XB) fee, and the non-US customer's issuer 410 earns a cross-border interchange.

Meanwhile, the logistics partner 404 keeps a predetermined amount, say $X, to cover the cross-border merchant discount, and passes the balance to the (preferably but optionally, pre-paid) currency card 412. The processor or program manager (PPCP/PM) for the currency card 412 keeps another pre-determined amount, say, $Y, and passes on the balance to the US pre-paid issuer 414, who earns the float.

In addition, as depicted at 416, the consumer 403 shops at an e-merchant using the static US BIN virtual pre-paid card 412. At 418, the e-merchant authorizes the transaction with a payment guarantee, keeps $Z of the spend (total purchase amount), and passes on the remainder (merchant discount) to the merchant's acquirer 420. The merchant's acquirer 420 keeps $A and passes the remaining amount, along with clearing and settlement data, to the payment network 408 (for example, network 2008). The network keeps $B and passes on the remainder (interchange component) to the issuing processor 424. The interchange component is then split four ways: the processor 424 gets $C, the issuing bank 414 gets $D, the program manager and/or processor for card 412 gets $E, and the logistics partner 404 gets $F.

FIG. 5 depicts exemplary e-wallet registration flow with prepaid card provisioning. At 501, the consumer 598 initiates registration with the e-wallet 597 and provides required information such as name, email address, billing address, funding card information, and the like. This step preferably includes payment method authentication of the funding card. At 502, the e-wallet detects that the consumer's shipping address is a non-US/UK address and sends a request to the shipping merchant 599 for shipping addresses. The e-wallet also provides the shipping merchant with consumer profile information, such as consumer name and shipping address, to facilitate the shipping merchant's shipping of purchases to the consumer at a later date. At 503, the shipping merchant 599 returns US/UK/Other shipping addresses, including the associated warehouse location for the particular consumer (i.e. suite number—specific location within the logistic partner) to the e-wallet.

At 504, the e-wallet presents the consumer with an opt-in decision for prepaid card(s) to use for cross border purchases; for example, a US prepaid card to use at US e-commerce retailers. At 505, the consumer indicates acceptance of the prepaid card(s). At 506, the e-wallet sends a request to the prepaid card issuer 596 for prepaid PANs to associate with the consumer's profile. The e-wallet provides consumer information to the prepaid card issuer in line with the issuer's requirements (for example, the so-called "Know Your Customer" due diligence policies). At 507, the prepaid card issuer 596 generates and returns multiple prepaid PANs (e.g. as a rule one for each country it supports for this program, with the exception of the consumer's country). In some instances, additional information could be returned; for example, associated expiration dates, and, where permitted by appropriate security procedures, the CVC 2 code or the like. At 508, the e-wallet sends the consumer a registration confirmation message via screen, e-mail or text based on the consumer's preference.

In some instances, at the time of payment, the merchant provides data to indicate what country it is located in, so that the appropriate prepaid (or other) card account can be selected. In other instances, this information could be provided at registration. In some instances, the wallet provides a suitable mechanism for payment authentication, such as the AVS and CVC2 technique currently used in the US, or alternative as may be used in other jurisdictions. In some cases, when a consumer already has an account with the shipping merchant (logistics partner), a new account is required for the consumer to access the wallet functionality in accordance with one or more embodiments of the invention. In one or more embodiments, a US/UK shipping address is automatically assigned to the consumer based on the consumer's actual shipping address. In one or more embodiments, the consumer must "opt in" for the prepaid card. Due consideration should be given to any privacy rules, regulations, concerns, or the like, in any jurisdictions of interest (and all such rules, regulations, and the like should of course be fully complied with); for example, as to appropriate consumer notification with respect to information being shared with the shipping merchant; proper handling of CVC2 or similar codes; taking care that only information that it is appropriate to retain in database 1479 is retained therein; and so on. In this regard, from a purely technical standpoint, the CVC2 code or the like could be stored; however, all applicable rules, regulations, privacy policies, and the like must of course always be complied with.

Consumer block 598 contemplates a consumer interacting with his or her computing device in a jurisdiction that is foreign to the jurisdiction where the e-commerce retailer is located. The consumer's computing device has a suitable web browser which downloads HTML pages or the like from the wallet block. Wallet block 597 contemplates a web server with suitable software which interacts in a client-server manner with the consumer's computer. The wallet web server may be located, for example, in the same jurisdiction as the jurisdiction where the e-commerce retailer is located (e.g., the USA), or in another jurisdiction. Prepaid card issuer block 596 contemplates suitable issuer platform software running on one or more servers run by, or on behalf of, the prepaid card issuer and may be located in the same jurisdiction as the jurisdiction where the e-commerce retailer is located, or in another jurisdiction. Shipping merchant block 599 corresponds to a physical warehouse in the same jurisdiction as the jurisdiction where the e-commerce retailer is located; however, it also contemplates a server or other computing device running a suitable software program (e.g., a database), which could be located in any suitable jurisdiction.

Figure 6:
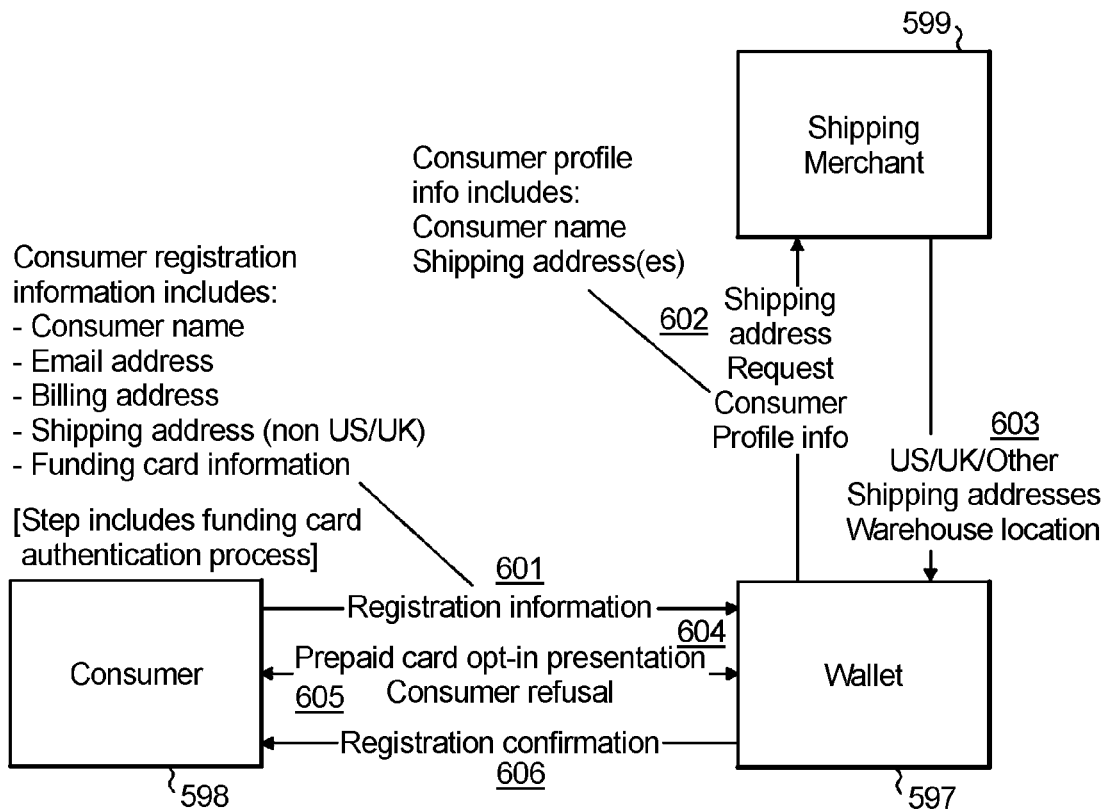
FIG. 6 depicts an exemplary e-wallet registration flow, without pre-paid card provisioning, according to an aspect of the invention.

FIG. 6 depicts an exemplary e-wallet registration flow, without pre-paid card provisioning. At 601, the consumer 598 initiates registration with the e-wallet 597 and provides required information such as name, email address, billing address, funding card information, etc. This step preferably includes payment method authentication of the funding card. At 602, the e-wallet detects that the consumer's shipping address is a non-US/UK address and sends a request to the shipping merchant 599 for shipping addresses. The e-wallet also provides the shipping merchant 599 with consumer profile information, such as consumer name and shipping address, to facilitate the shipping merchant's shipping of purchases to the consumer at a later date. At 603, the shipping merchant returns US/UK/Other shipping addresses, including the associated warehouse location for the particular consumer (i.e. suite number) to the e-wallet 597.

At 604, the e-wallet 597 presents the consumer 598 with an opt-in decision for prepaid card(s) to use for cross border purchases; for example, a US prepaid card to use at US e-Commerce retailers. At 605, the consumer refuses the prepaid card. At 606, the e-wallet sends the consumer a registration confirmation message via screen, e-mail or text based on the consumer's preference.

Unless stated otherwise, aspects of the process in FIG. 6 can be similar to those in FIG. 5, and in general, elements in the figures with the same reference character are similar.

Figure 7:
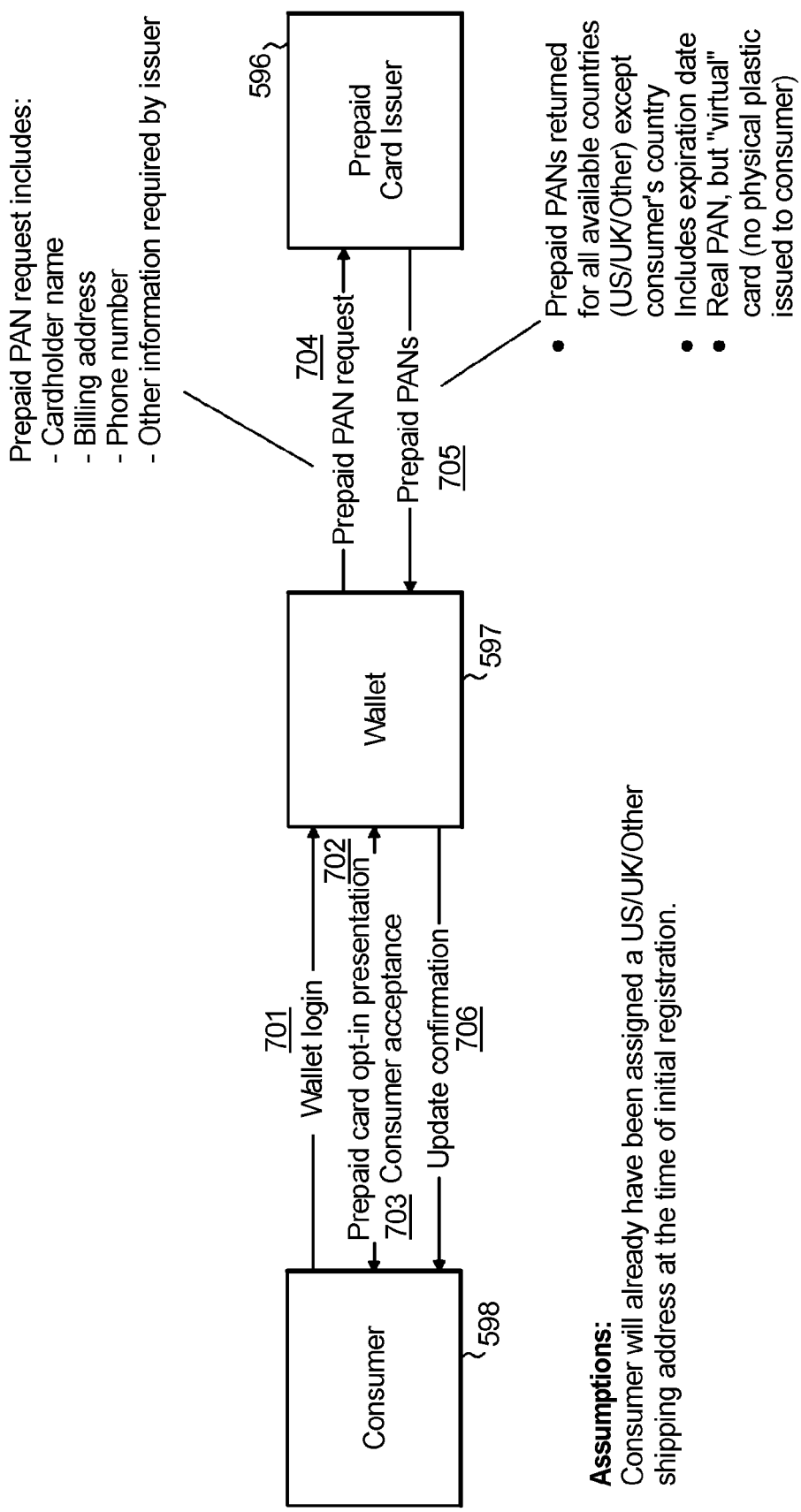
FIG. 7 depicts an exemplary process whereby consumers can obtain a pre-paid card after registering, according to an aspect of the invention.

FIG. 7 depicts an exemplary process whereby consumers can obtain a pre-paid card after registering, using a consumer profile modification to opt-in to cross border service. At 701, the consumer 598 logs on to the e-wallet 597. At 702, the e-wallet presents the consumer with an opt-in decision for prepaid card(s) to use for cross border purchases; for example, a US prepaid card to use at US e-commerce retailers. At 703, the consumer indicates acceptance of the prepaid card(s). At 704, the e-wallet sends a request to the prepaid card issuer 596 for prepaid PANs to associate with the consumer's profile. The e-wallet provides consumer information to the prepaid card issuer in line with the issuer's requirements (i.e. Know Your Customer, as discussed above). At 705, the prepaid card issuer generates and returns multiple prepaid PANs (e.g. as a rule one for each country it supports for the program, with the exception of the consumer's country). In some instances, additional information could be returned; for example, associated expiration dates, and, where permitted by appropriate security procedures, the CVC 2 code or the like. At 706, the e-wallet sends the consumer a confirmation of the update via screen, e-mail or text based on the consumer's preference.

Figure 8:
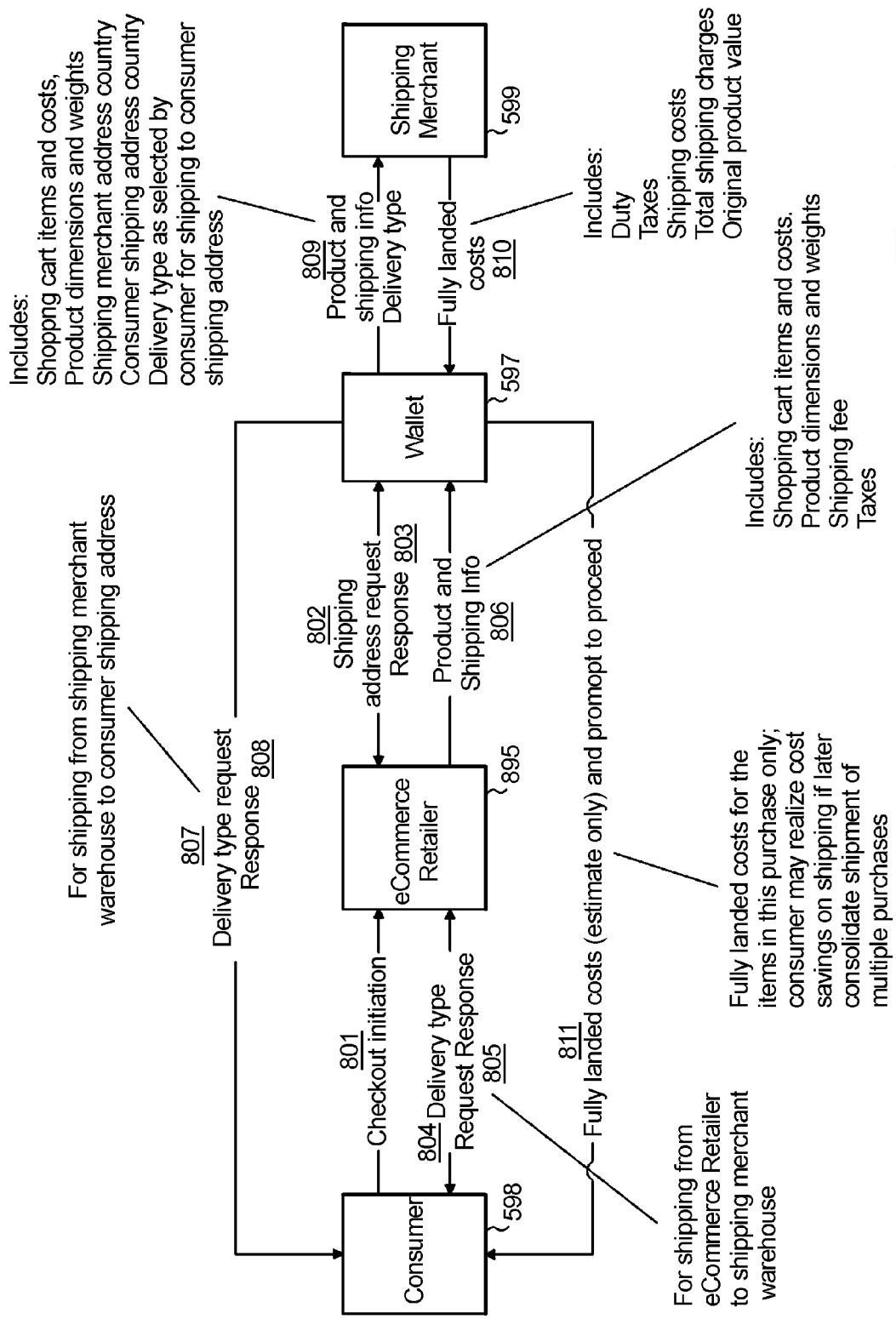
FIG. 8 depicts an exemplary shipping calculator flow, according to an aspect of the invention.

FIG. 8 depicts an exemplary shipping calculator flow. At 801, the consumer 598 clicks on the e-wallet 597 to perform a purchase at a participating e-commerce retailer 895 using the e-wallet. At 802, the e-commerce retailer generates a call to the e-wallet to initiate the checkout process. This includes a request for the shipping address so that the e-commerce retailer can calculate the cost of shipping to the shipping address of shipping merchant 599. At 803, the e-wallet provides shipping address information to the e-commerce retailer. The e-wallet selects the shipping address that corresponds to the e-commerce retailer's country.

At 804, the e-commerce retailer prompts the consumer to select preferred delivery type (standard, express, etc.) for shipping from the retailer to the shipping merchant's shipping address. At 805, the consumer selects the preferred delivery type. At 806, the e-commerce retailer provides the calculated shipping costs and applicable taxes in addition to product information from the consumer's shopping cart, including product dimensions and weights, to the e-wallet. At 807, the e-wallet prompts the consumer to indicate the desired delivery type for shipping from the shipping merchant site to the consumer's shipping address. At 808, the consumer selects the delivery type. At 809, the e-wallet facilitates interaction with the shipping merchant's shipping calculator to determine fully landed costs. Note that the "shipping merchant" 599 can be the same entity as the logistics partner and the terms are used somewhat interchangeably herein.

In addition to shopping cart product information as provided by the e-commerce retailer, the e-wallet provides the shipping merchant address country, consumer shipping address country, and delivery type selected by the consumer. The fully landed costs include the shipping costs from the e-commerce retailer to the shipping merchant warehouse shipping address (costs that were provided by the e-commerce retailer). At 810, the shipping merchant provides fully landed cost information in currencies associated with the shipping merchant address country and consumer shipping address country. Fully landed cost information includes duty, taxes, shipping costs from warehouse to consumer shipping address, total shipping charges (includes e-commerce retailer shipping costs), and original product value. At 811, the e-wallet presents fully landed costs to the consumer in both currencies along with a disclaimer that this is for estimating purposes only and may not reflect the final costs to the consumer, and the e-wallet requests whether the consumer wants to proceed with checkout.

The e-commerce retailer block 895 contemplates a server operated by or on behalf of the e-commerce retailer; the actual server may or may not be physically located in the same jurisdiction as the e-commerce retailer. The consumer invokes the wallet on check out. In cases, for example, such as flows 807, 808, and 811, the html pages from the wallet server may be passed to the consumer's computer through the e-commerce retailer's server; in other cases, interaction may be directly between the consumer's computer and the server of the wallet service. At the check-out page of the e-commerce retailer, the user will typically see several payment options; e.g., credit card, bill me later, and e-wallet. The latter may involve a pop-up window which prompts for authentication, for example.

In some cases, merchants will be able to supply product information according to the shipping calculator specifications—product type, estimated weight, product dimensions, and the like. Other embodiments can use an alternative approach. In some instances, fully landed costs include the cost of merchant shipment to the shipping merchant warehouse, and the shipping address is provided to the merchant at this point. This should occur before payment information is transferred to the merchant in the event that the consumer, upon viewing fully landed costs, decides to modify items in the cart or abandon purchase. Other alternatives may include the e-wallet tracking shipment methods and costs for each registered merchant that could be applied to the calculator, or receiving a feed from a shipping partner (e.g. DHL, Federal Express, UPS, etc.) in each region to approximate shipping costs based on product dimensions and weights.

Figure 9:
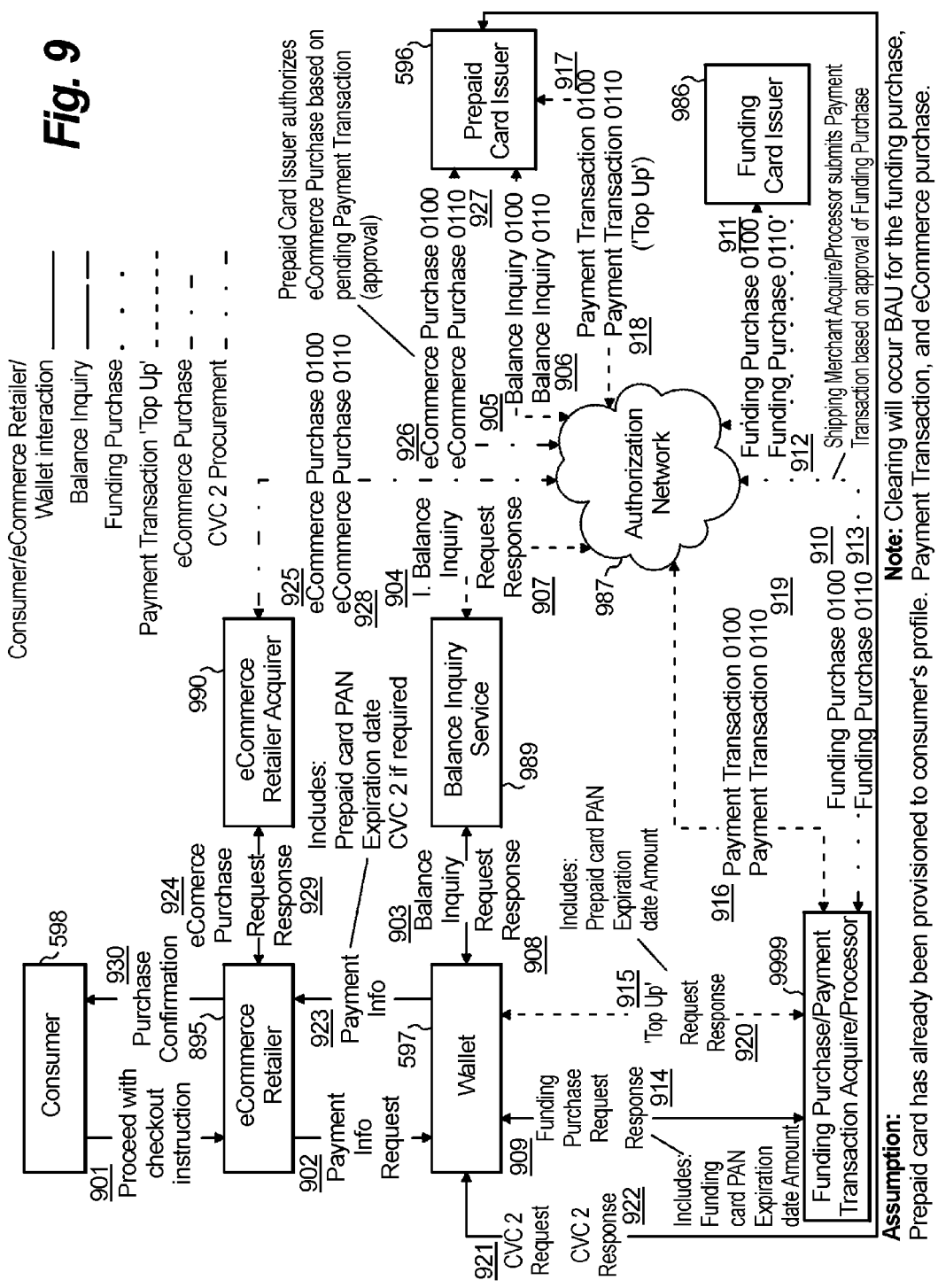
FIG. 9 depicts an exemplary transaction at an international merchant using a pre-paid card, according to an aspect of the invention.

FIG. 9 depicts an exemplary transaction at an international merchant using an existing pre-paid card. At 901, the consumer 598 responds affirmatively to an inquiry on whether to proceed with checkout after being provided with fully landed costs. At 902, the e-commerce retailer 895 generates a call to the e-wallet 597 to retrieve payment method and confirm shipping address information. At 903, the e-wallet initiates a request to the balance inquiry service 989 to generate a balance inquiry to the prepaid card issuer 596 to determine the amount of funds remaining on the prepaid card. The e-wallet 597 provides the balance inquiry service with the prepaid PAN associated with the e-commerce retailer country.

At 904, the balance inquiry service formats and sends a balance inquiry authorization request to the authorization network 987 (for example, network 2008) that is destined for the prepaid card issuer 596. At 905, the authorization network forwards the balance inquiry to the prepaid card issuer. At 906, the prepaid card issuer sends an authorization response for the balance inquiry with the amount of funds remaining on the prepaid card to the authorization network. At 907, the authorization network sends the authorization response to the balance inquiry service. At 908, the balance inquiry service provides the balance information to the e-wallet. At 909, the e-wallet generates a request to the funding purchase/payment transaction acquirer/processor 9999 to initiate a purchase against the default funding card associated with the consumer's profile for the amount that is the difference between the e-commerce purchase amount and the available amount on the prepaid card. E-wallet 597 provides the entity 9999 with the funding card PAN information and the amount.

Note that "0100" and "0110" refer to ISO 8583 messages "authorization request" and "authorization request response." All versions and all parts of ISO 8583, "Financial transaction card originated messages—Interchange message specifications," the International Organization for Standardization standard for systems that exchange electronic transactions made by cardholders using payment cards, are expressly incorporated herein by reference in their entirety for all purposes. The skilled artisan in the payments processing field will be thoroughly familiar with ISO 8583 in any case.

At 910, the entity 9999 formats and sends a purchase authorization request to the Authorization Network 987 that is destined for the funding card issuer 986. At 911, the authorization network forwards the purchase authorization request to the funding card issuer 986. At 912, the funding card issuer provides an approved response to the authorization request to the authorization network. At 913, the authorization network forwards the authorization response to the entity 9999. At 914, the entity 9999 forwards the authorization response to the wallet 597.

At 915, the e-wallet generates a request to the entity 9999 to initiate a payment transaction to "top up" funds to the prepaid card in the amount of the difference between the e-commerce purchase and remaining funds on the prepaid card (this is the same purchase amount that was approved by the funding card issuer 986). The e-wallet provides the entity 9999 with the prepaid PAN and the amount. The prepaid PAN is associated with the same country as the e-commerce retailer (e.g. US e-commerce retailer, US prepaid card). At 916, the entity 9999 formats and sends a payment transaction authorization request to the authorization network 987, that is destined for the prepaid card issuer 596.

At 917, the authorization network 987 forwards the payment transaction authorization request to the prepaid card issuer. At 918, the prepaid card issuer 596 provides an approved response to the authorization request to the authorization network 987. At 919, the authorization network forwards the authorization response to the entity 9999. At 920, the entity 9999 provides a response to the e-wallet indicating that the top-up was approved. Flows 921 and 922 show the CVC 2 request and response between the wallet and prepaid card issuer. In this regard, at the time of the purchase, once approval has been obtained from the funding card issuer, and top-up has been successfully accomplished, to make the purchase successful it is necessary to provide the merchant with all the details needed to move an authorization through. Thus, the merchant will need the CVC2 data. CVC2 data is often requested by the merchant to ensure that the person making an on-line transaction really has the card in his or her possession. In one or more embodiments, CVC2 data is not stored and so must be obtained from the prepaid card issuer. At 921 and 922, the CVC2 value is obtained for the specific prepaid card to be used in the purchase transaction. At 923, payment information including the prepaid card PAN, expiration date, and CVC 2 (if required) is provided by the wallet to the e-commerce retailer.

At 924, the e-commerce retailer 895 generates a request to its acquirer 990 to perform the e-commerce purchase against the prepaid card. At 925, the e-commerce retailer acquirer 990 formats and sends a purchase authorization request to the authorization network that is destined for the prepaid card issuer. At 926, the authorization network forwards the purchase authorization request to the prepaid card issuer 596. At 927, the prepaid card issuer 596 provides an approved response to the authorization request to the authorization network. At 928, the authorization network forwards the authorization response to the e-commerce retailer acquirer. At 929, the e-commerce retailer acquirer 990 forwards the authorization response to the e-commerce retailer. At 930, the e-commerce retailer provides purchase confirmation to the consumer 598.

The e-commerce retailer acquirer block 990 contemplates a bank in the same jurisdiction as the e-commerce retailer, as well as a server operated by or on behalf of the bank which may be located in any jurisdiction. The balance inquiry service block 989 contemplates a server with appropriate software which is configured to send a balance inquiry to the prepaid card issuer to determine how much is left on the card; such server is likely to be in the same jurisdiction as the e-wallet server, but could also be elsewhere. The prepaid card issuer block 596 contemplates a prepaid card issuer which is likely, but not necessarily, in the same jurisdiction as the e-commerce retailer, as well as a server run by or on behalf of the prepaid card issuer, with suitable software, which could be located in any jurisdiction. The funding card issuer block 986 contemplates a banking institution, most likely in the home country of the consumer, as well as a server run by or on behalf of such banking institution, with suitable software, which could be located in any jurisdiction. The authorization network 987 is typically a multinational network such as the BANKNET or VISANET networks discussed elsewhere, or payment processing networks of other operators. The funding purchase/payment transaction acquirer/processor block 9999 contemplates (i) an acquirer that handles the purchase on the card in the shopper's native country, as well as the top-up of the pre-paid card in the jurisdiction where the e-commerce retailer is located, as well as (ii) a server run by or on behalf of such acquirer, with suitable software. The server and acquirer could be in any jurisdiction(s) and could themselves be in the same or different jurisdictions. In some cases, the functionality of block 9999 could be split between two or more entities.

Due consideration of applicable legal and regulatory considerations and/or contractual obligations should be had, inasmuch as, in one or more embodiments, the merchant will be accepting a card and shipping to an address that are not technically the consumer's funding card and actual shipping address; furthermore, there also is not a physical (prepaid or other) card being issued (it is virtual).

In at least some embodiments due consideration should be given to addressing concerns of the shipping merchant acquirer and prepaid card issuer, with respect to their willingness to take on the risk of sending and/or approving a transaction before settlement has occurred. In one or more embodiments, the shipping merchant will initiate a payment transaction authorization request before settlement has occurred on the funding card purchase, and/or the prepaid card issuer will approve the e-commerce purchase before settlement has occurred on payment transaction.

In some cases, the prepaid card issuer will be able to restrict purchases on the prepaid card to only those occurring through the wallet—for example, will ensure billing and/or shipping address is the shipping merchant's warehouse. In other cases, an additional indicator will be required in the authorization request to indicate that the transaction was generated via the e-wallet.

Figure 13:
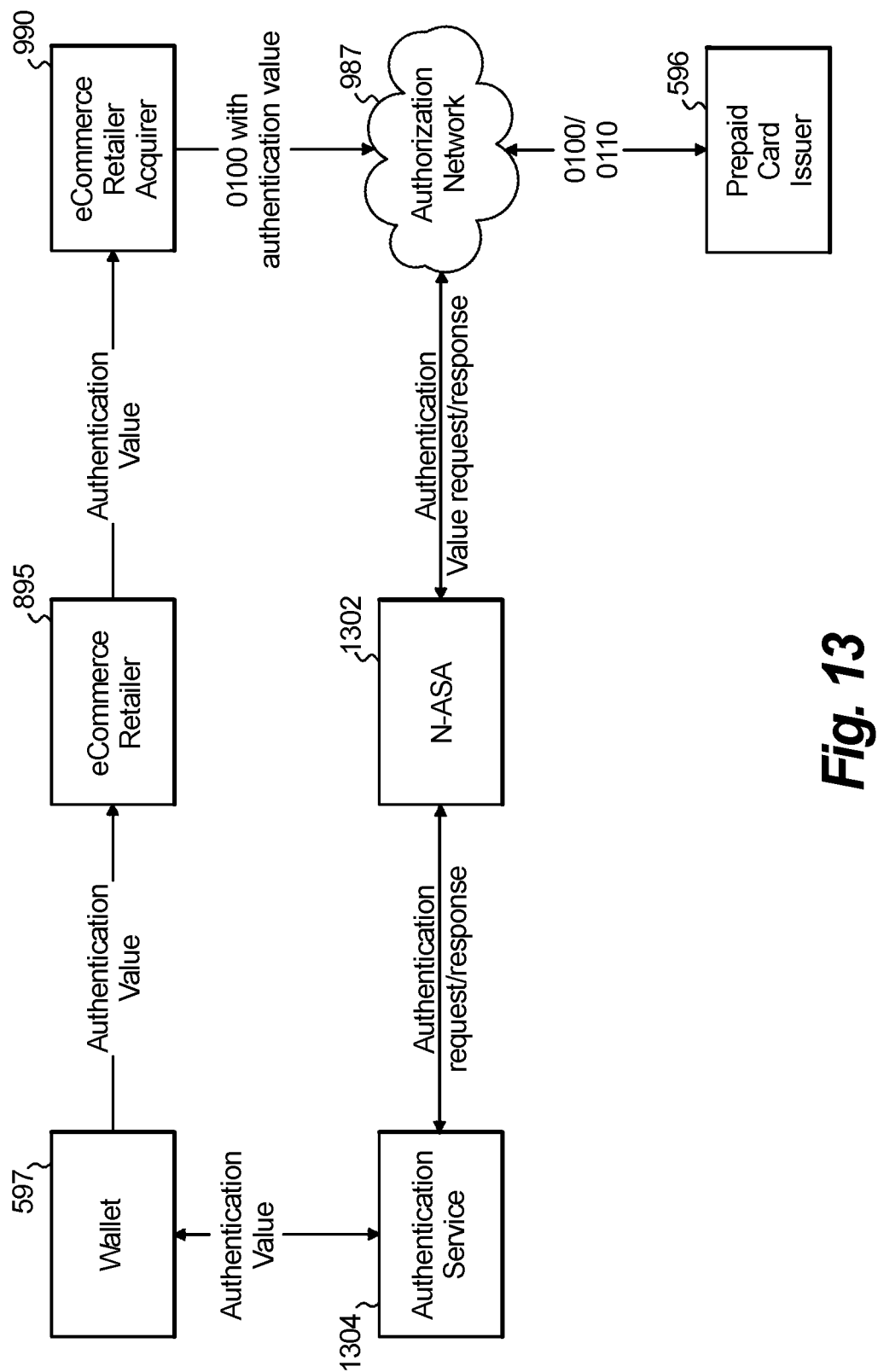
FIG. 13 shows exemplary transaction validation (prepaid card restriction to wallet) according to an aspect of the invention.

FIG. 13 depicts an exemplary transaction validation process. Aspects of FIG. 13 involve making certain that the prepaid card can only be used within the wallet. The wallet 597 receives an authentication value from the authentication service 1304 and then provides that same authentication value to the e-commerce retailer 895 which in turn passes the value on to its acquirer 990 within the authorization request. When the authorization request enters the network 987, a communication is made with the N-ASA block 1302. The N-ASA (network authorization services architecture) block 1302 contemplates a portion of the authorization network with additional intelligence to carry out additional value-added services, and can be located, for example, in the USA or any other jurisdiction. The N-ASA block validates that the authentication value provided by the wallet and present in the authorization request matches that assigned to the transaction. Block 1304 supplies the authentication value to the wallet 597, and also to the N-ASA block 1302 so that the N-ASA block can compare the values. In one or more embodiments, the authentication code is a unique dynamic value assigned to the transaction. If the authentication value matches, network 987 processes normally by sending the authorization request 0100 to the prepaid card issuer 596 and receiving the authorization request response 0110 therefrom. If the authentication value does not match, the transaction is declined.

Thus, in one or more embodiments, it may be desirable to ensure the prepaid card usage is restricted to the Wallet 597. One possible manner of attempting to achieve this involves a scheme wherein the Prepaid Card Issuer 596 only authorizes transactions that contained the shipping/billing address of the shipping merchant 599. However, because this information would be visible to the consumer, this may not be an ideal method to ensure that prepaid card usage is restricted to the Wallet 597.

Accordingly, in the preferred but non-limiting approach of FIG. 13, the Wallet 597 calls a service 1304 that creates a unique authentication value for each Wallet transaction using a prepaid card for the cross border service. In a preferred approach, as noted, a unique authentication value is used for each transaction (although a static value could be sued in an alternative embodiment). The Wallet provides the service 1304 with an ID of the eCommerce retailer 895 assigned by the operator of authorization network 987, as well as the applicable prepaid PAN. The service returns the authentication value to the Wallet. This value is passed to the eCommerce Merchant 895, which forwards it to their acquirer 990 for subsequent transmission in the authorization request 0100.

Upon the receipt of the transaction by the authorization network 987, it will determine that the authorization request is eligible for validation of this authentication value. One manner in which this can be carried out includes a Member Parameter System (MPS) service indicator value set at the account range level. Network 987 diverts the transaction to validation service 1302 prior to forwarding the transaction to the Prepaid Card Issuer 596. One manner that this can be carried out includes use of the existing data element for Universal Cardholder Authentication Field (UCAF), DE 48, sub-element 43, to transport the authentication value, with a different control bit.

In the event that another feature uses the Universal Cardholder Authentication Field, existing cross edits and processing specific to such other feature are preferably not applied to transactions with the e-Wallet, to avoid confusion.

If the validation service confirms the value provided by the merchant is the same as the value initially generated by the Wallet, the transaction will be allowed to continue processing. If the value is not present or is not matched, the Authorization Network will return a decline response to the acquirer and provide an authorization advice message to the issuer. A standard advice reason code could be used in one or more embodiments. In at least some cases, this authentication value and validation are performed for authorization requests only.

The authentication value is preferably associated with an expiration date (not the prepaid card's expiration date) to control the growth of the data. The expiration date is preferably configurable, but at this time it is believed that it should be at least 30-45 days to allow for merchants that split shipments and submit authorization requests accordingly.

Thus, by way of review, Wallet 597 generates a request for the authentication value to the Authentication Service 1304, including specific details that would be ultimately included in the authorization request, such as Payment Network Operator Assigned ID and PAN. The Authentication Service 1304 responds with a unique authentication value to be used for the transaction. The Wallet 597 passes the authentication value to the eCommerce Retailer 895 as part of the payment details. The eCommerce Retailer 895 provides the authentication value to the eCommerce Retailer Acquirer 990 as part of the authorization request. The eCommerce Retailer Acquirer 990 formats and sends a purchase authorization request to the Authorization Network that is destined for the Prepaid Card Issuer. The Authorization Network 987 determines, based on account range level indicator, that the prepaid account range is eligible for the authentication service and provides the applicable details to the ASA 1302. The ASA 1302 calls the Authentication Service 1304 to validate the authentication value. The Authentication Service 1304 confirms the authentication value is a match to the one that was initially generated and provides response to ASA 1302. The ASA 1302 provides confirmed response to Authorization Network 987. The Authorization Network 987 forwards the authorization request 0100 to the Prepaid Card Issuer 596. The Prepaid Card Issuer 596 provides an approved response 0110 to the authorization request to the Authorization Network 987. Prepaid Card Issuer 596 is approving the purchase based on the pending Payment Transaction that they have approved. The Authorization Network 987 forwards the authorization response to the eCommerce Retailer Acquirer 990. The eCommerce Retailer Acquirer 990 forwards the authorization response to the eCommerce Retailer 895. However, if there is not a match for the authentication value, the Authorization Network will send a declined response to the acquirer.

Figure 10:
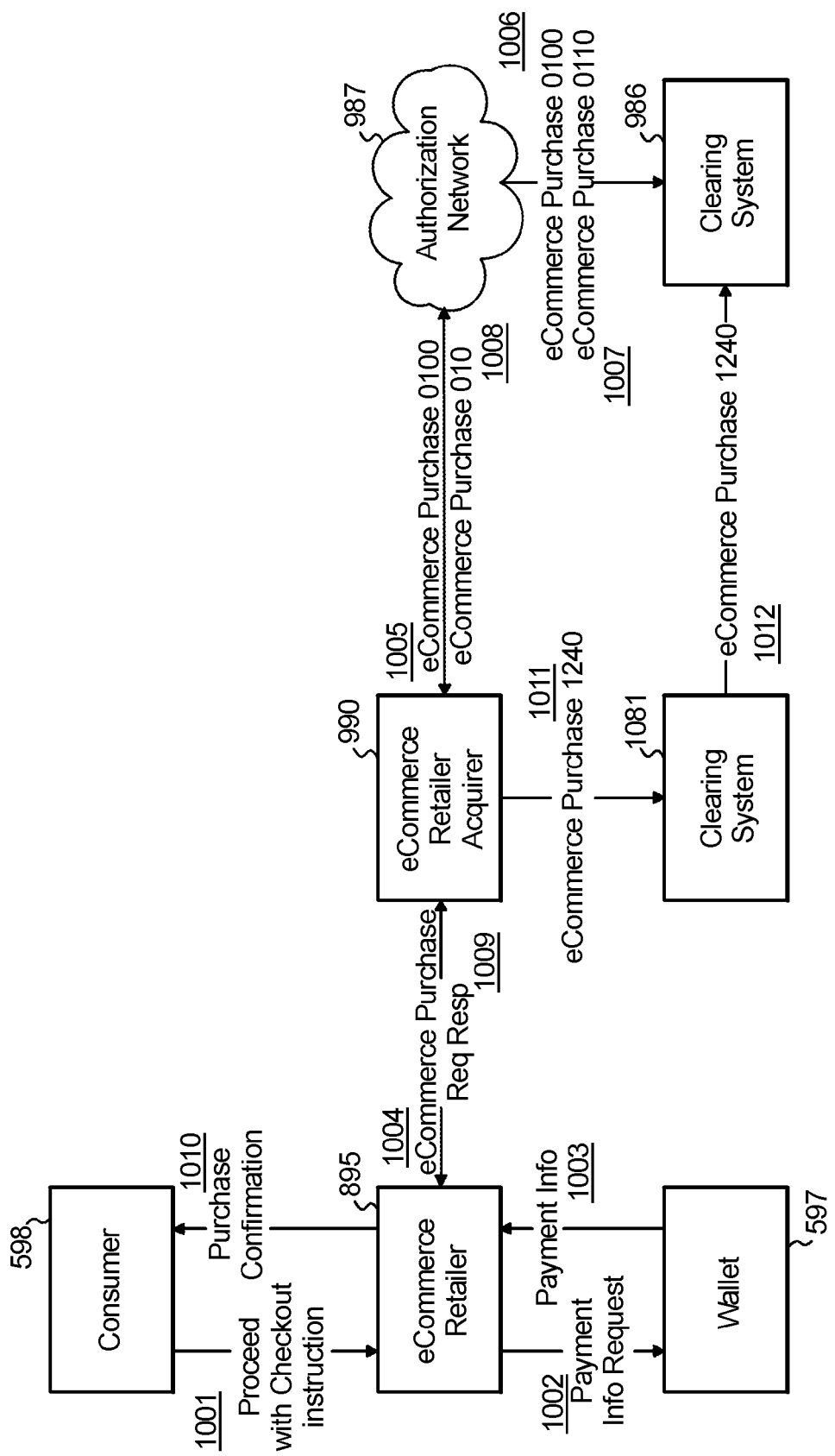
FIG. 10 depicts an exemplary transaction at an international merchant using a local funding card, according to an aspect of the invention.

FIG. 10 depicts an exemplary transaction at an international merchant using a local funding card, wherein a merchant accepts foreign-issued cards. At 1001, the consumer 598 responds affirmatively to an inquiry on whether to proceed with checkout. At 1002, the e-commerce retailer 895 generates a call to the e-wallet to retrieve payment method and confirm shipping address information. At 1003, the e-wallet 597 provides payment information to the e-commerce retailer 895, including funding card PAN and expiration date. In one or more embodiments, the e-wallet does not store the funding card CVC 2, so if the e-commerce retailer requires it, the consumer will need to populate that field on the e-commerce retailer site. At 1004, the e-commerce retailer generates a request to its acquirer 990 to perform the e-commerce purchase against the funding card. At 1005, the e-commerce retailer acquirer 990 formats and sends a purchase authorization request to the authorization network 987 that is destined for the funding card issuer 986. At 1006, the authorization network 987 forwards the purchase authorization request to the funding card issuer 986.

At 1007, the funding card issuer provides an approved response to the authorization request to the authorization network. At 1008, the authorization network forwards the authorization response to the e-commerce retailer acquirer 990. At 1009, the e-commerce retailer acquirer forwards the authorization response to the e-commerce retailer 895. At 1010, the e-commerce retailer provides purchase confirmation to the consumer. At 1011, the e-commerce retailer generates a clearing message (e.g., message type indicator (MTI) 1240) to the clearing system 1081 for the e-commerce purchase. At 1012, the clearing system sends a clearing message to the funding card issuer 986 for the e-commerce purchase.

Clearing system block 1081 contemplates a business-as-usual clearing system and can be located, for example, in the USA or another jurisdiction.

Figure 11:
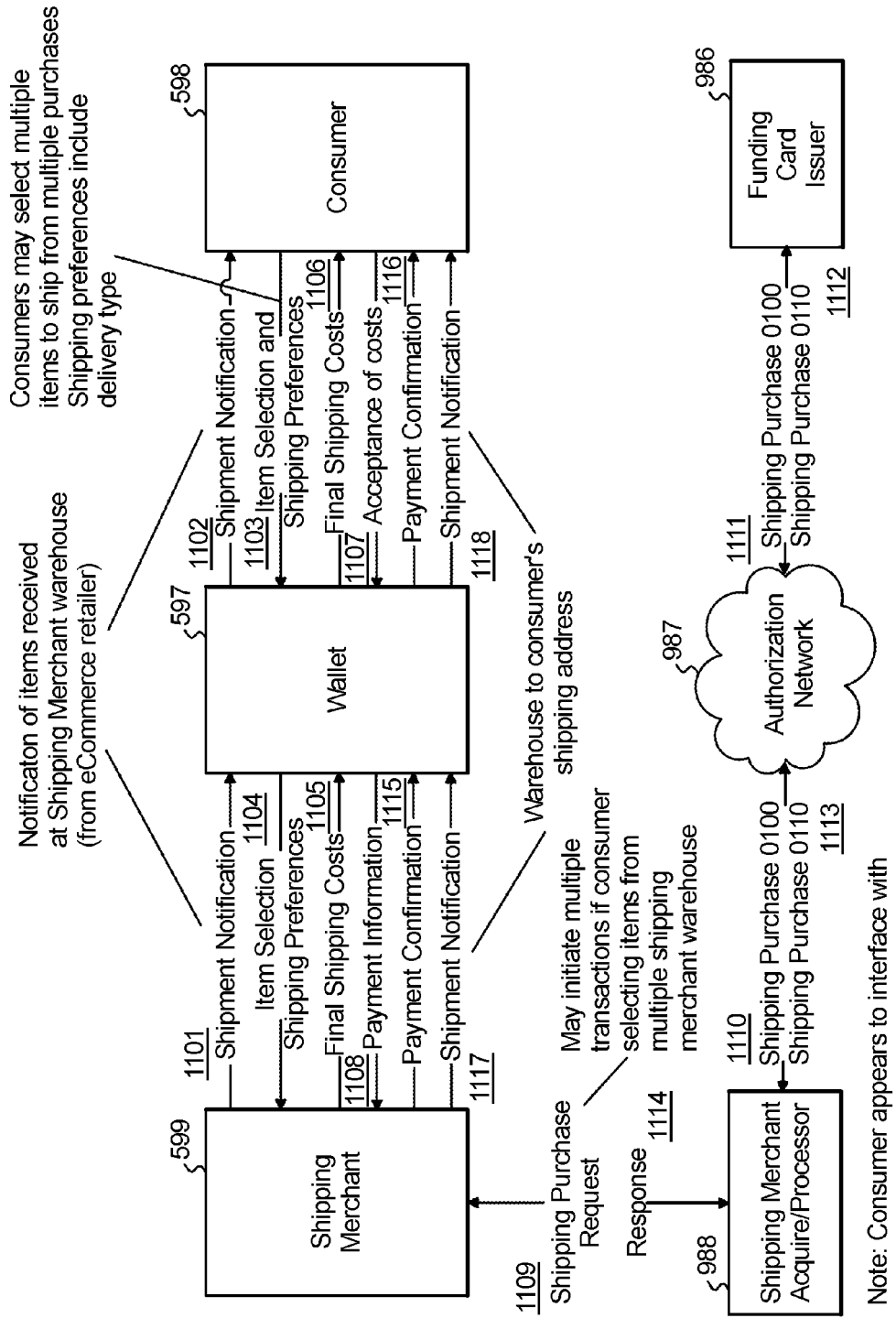
FIG. 11 depicts an exemplary shipping service, according to an aspect of the invention.

FIG. 11 depicts an exemplary shipping service. At 1101, the shipping merchant 599 sends notification to the e-wallet 597 that a consumer's goods have arrived in the warehouse. At 1102, the e-wallet sends notification to the consumer 598 that a shipment has been received. At 1103, the consumer selects items to be shipped to his or her shipping address and indicates delivery type, and the like (shipping preferences). At 1104, the e-wallet 597 provides the consumer's item selection, shipping preferences, and payment information (funding card) to shipping merchant 599. At 1105, the shipping merchant 599 provides final shipping costs to the e-wallet 597, and at 1106, the e-wallet passes same to consumer 598. At 1107, the consumer accepts the costs and at 1108, the e-wallet 597 provides payment information (funding card) to the shipping merchant 599.

At 1109, the shipping merchant initiates a purchase request to its acquirer 988 using the funding card information provided by the e-wallet. The amount is for the costs to ship the goods from the shipping merchant warehouse to the consumer's shipping address. Note that this amount may be different than the cost that was calculated by the shipping calculator at the time of the purchase. There may also be multiple purchase requests initiated in the event that the consumer has requested item shipment from multiple shipping merchant warehouses.

At 1110, the shipping merchant acquirer 988 formats and sends a purchase authorization request to the authorization network 987 that is destined for the funding card issuer 986. At 1111, the authorization network forwards the purchase authorization request to the funding card issuer. At 1112, the funding card issuer provides an approved response to the authorization request to the authorization network. At 1113, the authorization network forwards the authorization response to the shipping merchant acquirer. At 1114, the shipping merchant acquirer forwards the authorization response to the shipping merchant. At 1115, the shipping merchant sends a payment confirmation to the e-wallet. At 1116, the e-wallet sends a payment confirmation to the consumer indicating that his or her funding card has been charged the amount of the shipping costs. At 1117, the shipping merchant sends notification to the e-wallet that the consumer's items have been shipped. At 1118, the e-wallet sends notification to the consumer that the consumer's items have been shipped.

Shipping merchant acquirer/processor block 988 contemplates a bank, likely but not necessarily in the same jurisdiction as the shipping merchant, as well as a server and suitable software run by, or on behalf of, such bank, which server may be located in any jurisdiction.

In some embodiments, consumers are afforded the option of splitting shipments with friends.

In one or more embodiments, five authorization transactions may occur to complete the purchase using the prepaid card and to ship the purchased items to the consumer's shipping address:

Balance Inquiry Transaction Type:

This transaction type is pertinent to the prepaid card. The purpose is to determine if the amount of funds available on the prepaid card is enough to cover the purchase amount. There may be a balance on the card in the event that a previous purchase necessitated a return; the returned funds are preferably applied to the prepaid card.

Funding Purchase Transaction Type:

This transaction type is pertinent to the funding card. The purpose is to address the case where the purchase amount exceeds the amount of funds on the prepaid card, such that the shipping merchant must execute a purchase authorization request to the funding card issuer for the remaining amount needed.

Payment Transaction (Prepaid Top Up) Transaction Type:

This transaction type is pertinent to the prepaid card. The purpose is to address the case where the funding purchase is approved, in which case the shipping merchant will generate a payment transaction destined for the prepaid card issuer to credit the amount of funds from the funding purchase to the prepaid card. Note that this is occurring based on the funding card issuer's approval of the funding purchase and is before settlement occurs (assuming that settlement does indeed occur).

e-Commerce Purchase Transaction Type:

This transaction type is pertinent to the prepaid card. The purpose is to address the case where the prepaid top up is approved, in which case the prepaid card will be provided to the e-commerce retailer. This flow, in and of itself, is business as usual. However, note that the prepaid card issuer is approving the e-commerce purchase based on the PENDING payment transaction; pending, because settlement has not yet occurred.

Shipping Purchase Transaction Type:

This transaction type is pertinent to the funding card. The purpose is to address the case where the consumer selects items to be shipped. The shipping merchant initiates a purchase transaction against the consumer's default funding card for the amount of the shipping fees from the shipping merchant warehouse location to the consumer's shipping address. There may be multiple shipping purchase transactions if the consumer has items at multiple shipping merchant warehouses.

Figure 14:
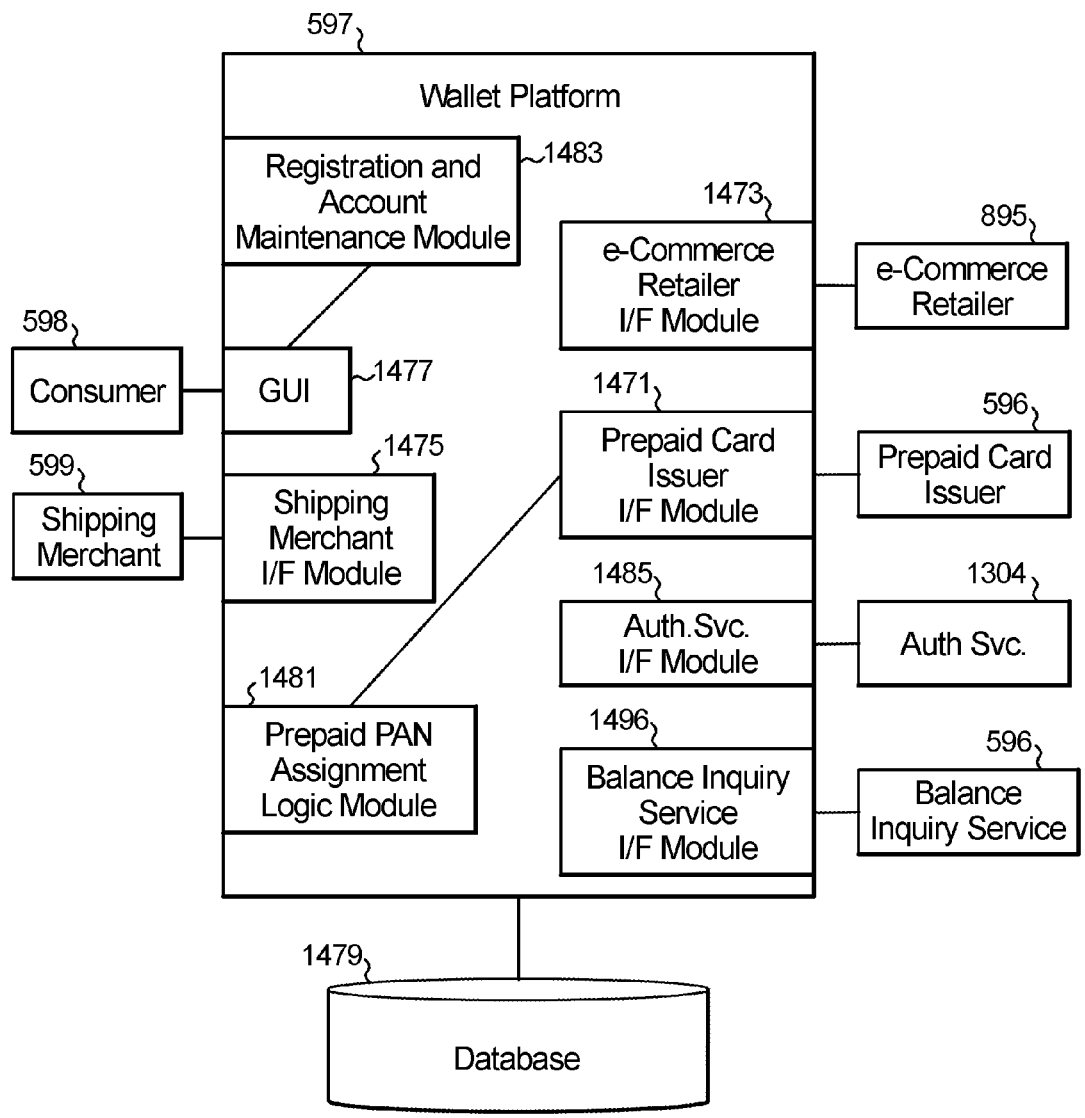
FIG. 14 is an exemplary software architecture diagram.

FIG. 14 shows an exemplary software architecture diagram. Wallet platform 597 includes executable code, stored in a non-transitory manner in a tangible computer-readable recordable storage medium, which, when loaded into the memory of one or more servers, causes one or more processors thereof to implement the logic described herein. Database 1479 includes a suitable database program such as the Oracle DBMS, Access and SQL Server from Microsoft, DB2 from IBM and the Open source DBMS MySQL, stored in a non-transitory manner in a tangible computer-readable recordable storage medium, as well as persistent storage to store the records therein. The database program, when loaded into the memory of one or more servers, causes one or more processors thereof to implement the database(s) described herein. The various interface modules include executable code, stored in a non-transitory manner in a tangible computer-readable recordable storage medium, which, when loaded into the memory of one or more servers, causes one or more processors thereof to implement the interface functionality and communication flows described herein, included any needed data translation between the wallet platform and the external entities. GUI 1477 provides an interface to consumer 598; shipping merchant interface module 1475 provides an interface to shipping merchant 599; balance inquiry service interface module 1469 provides an interface to balance inquiry service 989; prepaid card issuer interface module 1471 provides an interface to prepaid card issuer 596; and e-commerce retailer interface module 1473 provides an interface to e-commerce retailer 895. Furthermore, authentication service interface module 1485 provides an interface to authentication service 1304; prepaid PAN assignment logic module decides what countries to instantiate local account numbers in, according to one or more rules, for cases where more than one country is available; and registration and account maintenance module 1483 interfaces with consumer 598 via GUI 1477 to perform registration and maintenance functions; new data and/or updates can be stored in database 1479.

Recapitulation

One or more embodiments thus advantageously provide the ability to use a payment method from the country the consumer is shopping in as well as a delivery mechanism so the logistics (shipping) portion can be satisfied on behalf of the consumer.

Given the discussion thus far, it will be appreciated that, in general terms, one or more embodiments contemplate an exemplary method of providing a secure on-line shopping experience at an e-commerce retailer located in a first country to a plurality of consumers in at least one country other than the first country. The consumers have physical addresses in the at least one country other than the first country. An optional step 501 includes obtaining, at an electronic wallet server 597, from the plurality of consumers 598, registration information. The registration information in turn includes at least name, physical address in the at least one country other than the first country, and funding payment card account information.

Reference is made to FIGS. 5, 6, and 14, and description thereof elsewhere herein. The aforementioned optional registration step can be carried out, for example, by interaction between the wallet platform 597 and consumer 598, facilitated by a suitable consumer user interface such as graphical user interface (GUI) 1477. GUI 1477 may include, for example, HTML served out from a server or servers on which platform 597 runs to a browser on a machine of consumer 598. The registration information can be stored in database 1479. Registration and account maintenance module 1483 also takes part in the registration (and account maintenance) process, interfacing with the consumer via GUI 1477. Optionally, the registration includes obtaining the information via one of a browser using a secure socket layer and a secure hypertext transfer protocol uniform resource locator, and the registration information is stored in database 1479 in an encrypted manner accessible to the electronic wallet server but shielded from the e-commerce retailer.

A further step (see, e.g., 502, 503) includes facilitating assigning, to the plurality of consumers, local shipping addresses in the first country. This step may be carried out, for example, by shipping merchant interface module 1475. A still further step 802 includes obtaining, at the electronic wallet server, in connection with an on-line shopping session of a given one of the consumers at the e-commerce retailer 895, a request, from the e-commerce retailer, for a corresponding one of the local shipping addresses assigned to the given one of the consumers; and an even further step 803 includes supplying the corresponding one of the local shipping addresses to the e-commerce retailer in response to the request therefor. These steps 802, 803 may be carried out, for example, by e-commerce retailer interface module 1473 interfacing with database 1479.

An even further step 806 includes obtaining, at the electronic wallet server, in connection with the on-line shopping session of the given one of the consumers at the e-commerce retailer, product information and an indication of a desired form of shipping from the e-commerce retailer to the corresponding one of the local shipping addresses. This step can be carried out in a variety of ways. In some cases, this information is provided to the wallet 597 from the e-commerce retailer 895, and the steps are carried out by the e-commerce retailer interface module 1473. On the other hand, in some cases, this information comes from the consumer 598 via a suitable consumer user interface such as GUI 1477.

Another step 807 includes obtaining, at the electronic wallet server, in connection with the on-line shopping session of the given one of the consumers at the e-commerce retailer, an indication of a desired form of shipping from the corresponding one of the local shipping addresses to a corresponding one of the physical addresses in the at least one country other than the first country. This step can also be carried out in a variety of ways. In some cases, this information is provided to the wallet 597 from the e-commerce retailer 895, and the steps are carried out by the e-commerce retailer interface module 1473. However, in the embodiment depicted in FIG. 8, this information comes from the consumer 598 via a suitable consumer user interface such as GUI 1477.

It is worth noting at this point that in the exemplary embodiment of FIG. 8, interaction between consumer 598 and retailer 895 is used to specify the desired form of shipping from the e-commerce retailer 895 to the shipping merchant 599. Retailer 597 then provides this information to wallet 597. Fully landed cost includes, inter alia, costs for shipment from merchant 895 to shipping merchant warehouse 599, as well as costs for shipping from the shipping merchant warehouse 599 to the consumer's physical address in his or her home country. However, retailer 895 typically does not care how shipment occurs from the shipping merchant's warehouse 599 to the consumer's physical address in his or her home country. Thus, in the non-limiting exemplary embodiment of FIG. 8, the wallet 597 obtains product information and local shipping information (895 to 599) from e-commerce retailer 895. For information on the actual shipment from shipping merchant 599 to the consumer's physical address in his or her home country, refer to FIG. 11 which depicts what happens once it is known that the goods have been shipped from retailer 895 to warehouse 599. FIG. 8 and the steps discussed just above are directed to the estimate for shipment from shipping merchant 599 to the consumer's physical address in his or her home country, used to develop the estimated fully landed cost. For purposes of estimating the fully landed cost, in the non-limiting example of FIG. 8, consumer 598 interacts directly with wallet 597 via user interface 1477 or the like, to indicate how he or she wants the goods shipped to his or her home country from shipping merchant 599. As noted, however, in some cases the retailer 895 acts as an intermediary.

Yet another step 811 includes dispatching, from the electronic wallet server, an indication, destined for the given one of the consumers, of an estimated fully landed cost associated with the on-line shopping session. The estimated fully landed cost is based at least upon the product information, the indication of the desired form of shipping from the e-commerce retailer to the corresponding one of the local shipping addresses, and the indication of the desired form of shipping from the corresponding one of the local shipping addresses to the corresponding one of the physical addresses in the at least one country other than the first country. Step 811 may be carried out, for example, via user interface 1477 or the like (e.g., GUI 1477 serves HTML code to the consumer's machine that causes another window to pop up thereon); however, in some cases the retailer 895 acts as an intermediary.

In some instances, the method further includes, as at 809, dispatching, from the electronic wallet server, to a shipping merchant 599, the product information and the indication of the desired form of shipping from the corresponding one of the local shipping addresses to the corresponding one of the physical addresses in the at least one country other than the first country; and, as at 810, obtaining, at the electronic wallet server, from the shipping merchant, at least a pertinent portion of the estimated fully landed costs comprising at least shipping costs from the corresponding one of the local shipping addresses to the corresponding one of the physical addresses in the at least one country other than the first country, and associated governmental fees. The indication of the estimated fully landed cost is then based, at least in part, on the at least pertinent portion of the estimated fully landed costs obtained at the electronic wallet server from the shipping merchant. Steps 809 and 810 may be carried out, for example, by shipping merchant interface module 1475. The wallet platform itself may, for example, include executable code to calculate the estimated fully landed cost from all the inputs.

Reference is made to FIGS. 5 and 14, and description thereof elsewhere herein. In some cases, further steps include, as at 506, dispatching a request, from the electronic wallet server, to a card issuer, for a local card number for the first country for each consumer of the plurality of consumers; and, as at 507, obtaining, by the electronic wallet server, from the card issuer, the local card number for the first country for each consumer of the plurality of consumers. In at least some such cases, each given one of the local card numbers for the first country is linked to corresponding ones of the funding payment card accounts. Steps 506 and 507 may be carried out, for example, via prepaid card issuer interface module 1471. Note that prepaid card issuer interface module 1471 is employed to obtain the local card number, which the wallet 597 preferably saves to the consumer's profile in database 1479. Steps 506 and 507 are thus part of a registration process preferably completed prior to the actual transaction. Once actual transactions are performed, wallet 597 knows where (i.e., in what country) the transaction is and what card to pick from the database 1479. Actual authorization requests to and responses from card issuer 596 can be sent over a payment processing network; for example, using a MASTERCARD INTERFACE PROCESSOR OR MIP and the BANKNET VPN.

In many cases, the service will be available for e-commerce retailers located in more than one country. In such cases, the e-commerce retailer located in the first country is a first e-commerce retailer, and the secure on-line shopping experience is provided at a plurality of additional e-commerce retailers located in a plurality of additional countries. In such cases, the dispatching of the request for the local card number in the first country further includes dispatching a request for a local card number in at least one of the plurality of additional countries, based on a rule. Various examples of rules are given elsewhere herein. This process can be facilitated by the prepaid PAN assignment logic module 1481, interfacing with the prepaid card issuer interface module 1471.

The aforementioned linking may be accomplished, for example, during storage in database 1479 during registration; during the actual transaction, the platform 597 can access the database 1479 without any need for a linking step at transaction time; linking is thus done a priori in one or more embodiments.

It is worth noting that if desired, a balance inquiry service interface module 1469 can be provided to interface with the balance inquiry service 989.

In one or more embodiments, further steps include, as at 902, obtaining, at the electronic wallet server, in connection with the on-line shopping session of a given one of the consumers at the e-commerce retailer, a request, from the e-commerce retailer, for payment information; and, as at 923, supplying the payment information to the e-commerce retailer in response to the request therefor. The payment information includes a corresponding one of the local card numbers. These steps 902 and 923 may be carried out, for example, by e-commerce retailer interface module 1473.

In some cases, referring to FIG. 9, steps 909-914, an additional step can be generally described as the electronic wallet server 597 communicating with an entity 9999 associated with the corresponding ones of the funding payment card accounts to initiate a funding account purchase for an amount equal to a difference between a cost associated with the on-line shopping session of the given one of the consumers and an available amount in an account associated with the corresponding one of the local card numbers.

In some cases, further steps include, as at 915, dispatching, from the electronic wallet server, a request, to the entity 9999 associated with the corresponding ones of the funding payment card accounts, for top-up of the account associated with the corresponding one of the local card numbers, by the amount equal to the difference between the cost associated with the on-line shopping session of the given one of the consumers and the available amount in the account associated with the corresponding one of the local card numbers; and, as at 920, obtaining, at the electronic wallet server, from the entity associated with the corresponding ones of the funding payment card accounts, an indication of success of the top-up request.

Consider the case where the cardholder's real funding card is not issued in the same country where the cardholder is trying to make an online purchase (i.e., not issued in same country as the merchant). The flow depicted from 909-914 is followed in such a case. Before the prepaid card is used, it must be confirmed that the cardholder's funding card issuer will approve a transaction in the amount of the purchase. Suppose, for example, the cardholder wants to purchase something worth $150. Before allowing use of the prepaid card, the wallet 597 will trigger a series of steps 909-914 to verify with the funding card issuer 986 that the consumer has adequate funds. Once this has been approved, it is acceptable to top-up $150 onto the prepaid card to be used in the transaction, as at 915-920. Thus, the funding is verified with the funding card issuer and if successful, the prepaid card offered as part of the cross-border service is topped-up for $150. The pre-paid card is issued in the same jurisdiction as the merchant where the shopping is taking place.

As described, for example, with respect to FIG. 13, in some instances, the electronic wallet server obtains, from an authentication service 1304, an authentication value unique to a transaction associated with the on-line shopping session. The electronic wallet server supplies the unique value to the e-commerce retailer 895. The local card number cannot be used for a purchase without the unique value. These steps can be facilitated using the authentication service interface module 1485.

Further optional steps include, as at 1101, obtaining, at the electronic wallet server, an indication from the shipping merchant that at least one product associated with the on-line shopping session has arrived at the corresponding one of the local shipping addresses; as at 1102, dispatching, from the electronic wallet server, an indication, destined for the given one of the consumers 598, that the at least one product associated with the on-line shopping session has arrived at the corresponding one of the local shipping addresses; and, as, for example, at 1103, 1106, 1107, interacting with the given one of the consumers to obtain at least one direction (e.g., desired shipping technique and/or grouping with other products) associated with the at least one product. Step 1101 can be carried out, for example, via shipping merchant interface module 1475. Step 1102 can be carried out, for example, via user interface 1477 or the like; however, in some cases the retailer 895, merchant 599, or another party acts as an intermediary.

As discussed further below, another optional step includes providing a system, wherein the system includes distinct software modules, each embodied in a non-transitory manner on at least one tangible computer readable recordable storage medium, including an electronic wallet platform module to implement block 597, and any one, some, or all of a user interface module to implement block 1477, a shipping merchant interface module to implement block 1475, a database module to implement block 1479, a balance inquiry service module to implement block 1469; a prepaid card issuer interface module to implement block 1471, and an e-commerce retailer interface module to implement block 1473. The blocks may be implemented by the software modules together with corresponding memories and one or more processors. In a preferred but non-limiting approach, the interface modules include code to carry out the indicated functionality as well as any required translation functionality to interface with the external systems.

Figure 12:
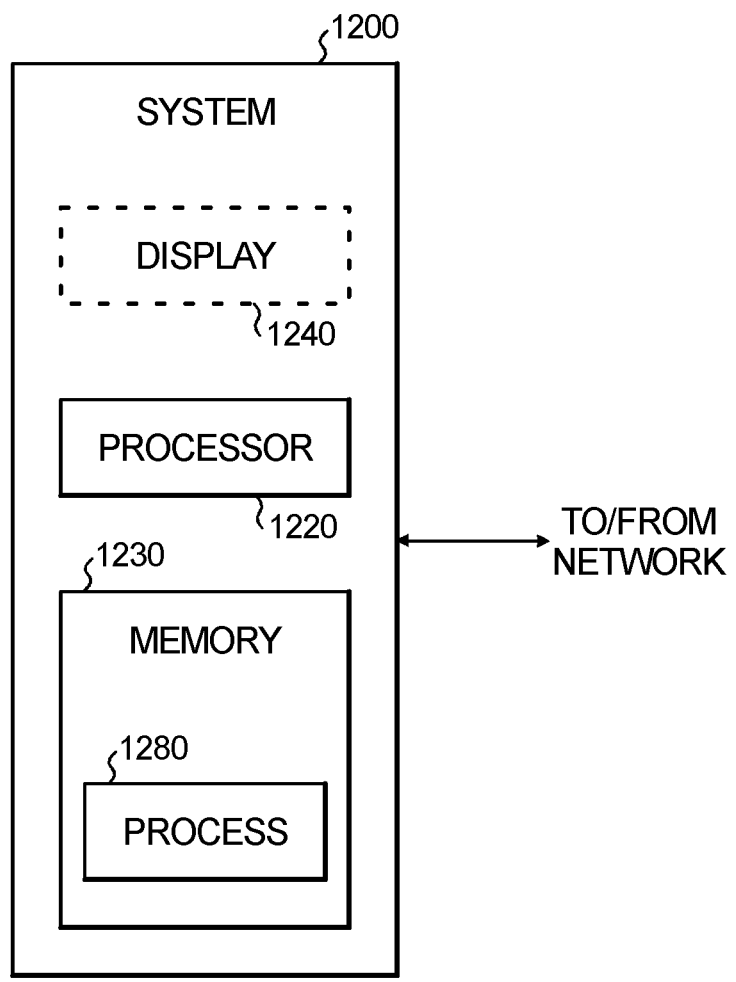
FIG. 12 is a block diagram of an exemplary computer system useful in one or more embodiments of the invention.

In another aspect, referring to FIGS. 12 and 14, an electronic wallet server system for providing a secure on-line shopping experience at an e-commerce retailer located in a first country to a plurality of consumers in at least one country other than the first country, the consumers having physical addresses in the at least one country other than the first country, includes a memory (e.g., RAM and ROM in 1230), at least one processor 1220 operatively coupled to the memory; and a persistent storage device (e.g., hard drive or the like in 1230) operatively coupled to the memory and storing in a non-transitory manner instructions which when loaded into the memory cause the at least one processor to be operative to carry out any one, some, or all of the method steps set forth herein. The instructions may be organized as the distinct software modules of FIG. 14, for example.

Thus, an embodiment of an apparatus, such as the aforementioned electronic wallet server system, includes means for facilitating assigning to said plurality of consumers local shipping addresses in said first country; means for obtaining, at said electronic wallet server system, in connection with an on-line shopping session of a given one of said consumers at said e-commerce retailer, a request, from said e-commerce retailer, for a corresponding one of said local shipping addresses assigned to said given one of said consumers; and means for supply said corresponding one of said local shipping addresses to said e-commerce retailer in response to said request therefor. The embodiment further includes means for obtaining, at said electronic wallet server system, in connection with said on-line shopping session of said given one of said consumers at said e-commerce retailer, product information and an indication of a desired form of shipping from said e-commerce retailer to said corresponding one of said local shipping addresses; means for obtaining, at said electronic wallet server system, in connection with said on-line shopping session of said given one of said consumers at said e-commerce retailer, an indication of a desired form of shipping from said corresponding one of said local shipping addresses to a corresponding one of said physical addresses in said at least one country other than said first country; and means for dispatching, from said electronic wallet server system, an indication, destined for said given one of said consumers, of an estimated fully landed cost associated with said on-line shopping session, said estimated fully landed cost being based at least upon said product information, said indication of said desired form of shipping from said e-commerce retailer to said corresponding one of said local shipping addresses, and said indication of said desired form of shipping from said corresponding one of said local shipping addresses to said corresponding one of said physical addresses in said at least one country other than said first country. In each case the means can include, for example, a memory (e.g., RAM and ROM in 1230), at least one processor 1220 operatively coupled to the memory; and a persistent storage device (e.g., hard drive or the like in 1230) operatively coupled to the memory and storing in a non-transitory manner instructions which when loaded into the memory cause the at least one processor to be operative to carry out the method step corresponding to the given means; the instructions may be organized, for example, as the distinct software modules of FIG. 14.

In some embodiments of the electronic wallet server system, said instructions on said persistent storage device comprise distinct software modules, and said distinct software modules comprise an electronic wallet platform module, a user interface module, a shipping merchant interface module, a database module, and an e-commerce retailer interface module. In such cases, said shipping merchant interface module together with said electronic wallet platform module comprise said instructions which cause said at least one processor to facilitate; said e-commerce retailer interface module, interacting with said database module, comprise said instructions which cause said at least one processor to obtain said request and to supply said corresponding one of said local shipping addresses; and at least one of said e-commerce retailer interface module and said user interface module, executing together with said electronic wallet platform module, comprise said instructions which cause said at least one processor to:

obtain said product information and said indication of said desired form of shipping from said e-commerce retailer to said corresponding one of said local shipping addresses;

obtain said indication of said desired form of shipping from said corresponding one of said local shipping addresses to said corresponding one of said physical addresses; and dispatch said indication of said estimated fully landed cost.

Some embodiments of the electronic wallet server system further include means for obtaining at said electronic wallet server system, from said plurality of consumers, registration information, said registration information in turn comprising at least name, said physical address in said at least one country other than said first country, and funding payment card account information; for example, with regard to such means, said persistent storage device may further store in a non-transitory manner instructions which when loaded into said memory cause said at least one processor to be operative to obtain, at said electronic wallet server system, from said plurality of consumers, registration information, said registration information in turn comprising at least name, said physical address in said at least one country other than said first country, and funding payment card account information.

Some embodiments of the electronic wallet server system further include means for dispatching, from said electronic wallet server system, to a shipping merchant, said product information and said indication of said desired form of shipping from said corresponding one of said local shipping addresses to said corresponding one of said physical addresses in said at least one country other than said first country; and means for obtaining, at said electronic wallet server system, from said shipping merchant, at least a pertinent portion of said estimated fully landed costs comprising at least shipping costs from said corresponding one of said local shipping addresses to said corresponding one of said physical addresses in said at least one country other than said first country, and associated governmental fees. In such cases, said indication of said estimated fully landed cost is based, at least in part, on said at least pertinent portion of said estimated fully landed costs obtained at said electronic wallet server from said shipping merchant. For example, with regard to such means, said persistent storage device further stores in a non-transitory manner instructions which when loaded into said memory cause said at least one processor to be operative to: dispatch, from said electronic wallet server system, to a shipping merchant, said product information and said indication of said desired form of shipping from said corresponding one of said local shipping addresses to said corresponding one of said physical addresses in said at least one country other than said first country; and obtain, at said electronic wallet server system, from said shipping merchant, at least a pertinent portion of said estimated fully landed costs comprising at least shipping costs from said corresponding one of said local shipping addresses to said corresponding one of said physical addresses in said at least one country other than said first country, and associated governmental fees. Again, said indication of said estimated fully landed cost is based, at least in part, on said at least pertinent portion of said estimated fully landed costs obtained at said electronic wallet server from said shipping merchant.

Some embodiments of the electronic wallet server system further include means for dispatching a request, from said electronic wallet server system, to a card issuer, for a local card number for said first country for each consumer of said plurality of consumers; and means for obtaining, by said electronic wallet server system, from said card issuer, said local card number for said first country for each consumer of said plurality of consumers. For example, with regard to such means, said persistent storage device further stores in a non-transitory manner instructions which when loaded into said memory cause said at least one processor to be operative to: dispatch a request, from said electronic wallet server system, to a card issuer, for a local card number for said first country for each consumer of said plurality of consumers; and obtain, by said electronic wallet server system, from said card issuer, said local card number for said first country for each consumer of said plurality of consumers.

In some embodiments of the electronic wallet server system, said e-commerce retailer located in said first country comprises a first e-commerce retailer; and said system is also for providing said secure on-line shopping experience at a plurality of additional e-commerce retailers located in a plurality of additional countries. In such cases, the electronic wallet server system may further include means for dispatching a request for a local card number in at least one of said plurality of additional countries, based on a rule. For example, with regard to such means, said persistent storage device further stores in a non-transitory manner instructions which when loaded into said memory cause said at least one processor to be operative to dispatch a request for a local card number in at least one of said plurality of additional countries, based on a rule.

Some embodiments of the electronic wallet server system further include means for linking each given one of said local card numbers for said first country to corresponding ones of said funding payment card accounts. For example, with regard to such means, said persistent storage device further stores in a non-transitory manner instructions which when loaded into said memory cause said at least one processor to be operative to link each given one of said local card numbers for said first country to corresponding ones of said funding payment card accounts.

Some embodiments of the electronic wallet server system further include means for obtaining, at said electronic wallet server system, in connection with said on-line shopping session of a given one of said consumers at said e-commerce retailer, a request, from said e-commerce retailer, for payment information; and means for supplying said payment information to said e-commerce retailer in response to said request therefor, said payment information comprising a corresponding one of said local card numbers. For example, with regard to such means, said persistent storage device further stores in a non-transitory manner instructions which when loaded into said memory cause said at least one processor to be operative to: obtain, at said electronic wallet server system, in connection with said on-line shopping session of a given one of said consumers at said e-commerce retailer, a request, from said e-commerce retailer, for payment information; and supply said payment information to said e-commerce retailer in response to said request therefor, said payment information comprising a corresponding one of said local card numbers.

Some embodiments of the electronic wallet server system further include means for causing said electronic wallet server system to communicate with an entity associated with said corresponding ones of said funding payment card accounts to initiate a funding account purchase for an amount equal to a difference between a cost associated with said on-line shopping session of said given one of said consumers and an available amount in an account associated with said corresponding one of said local card numbers. For example, with regard to such means, said persistent storage device further stores in a non-transitory manner instructions which when loaded into said memory cause said at least one processor to be operative to: cause said electronic wallet server system to communicate with an entity associated with said corresponding ones of said funding payment card accounts to initiate a funding account purchase for an amount equal to a difference between a cost associated with said on-line shopping session of said given one of said consumers and an available amount in an account associated with said corresponding one of said local card numbers.

Some embodiments of the electronic wallet server system further include means for dispatching, from said electronic wallet server system, a request, to said entity associated with said corresponding ones of said funding payment card accounts, for top-up of said account associated with said corresponding one of said local card numbers, by said amount equal to said difference between said cost associated with said on-line shopping session of said given one of said consumers and said available amount in said account associated with said corresponding one of said local card numbers; and means for obtaining, at said electronic wallet server system, from said entity associated with said corresponding ones of said funding payment card accounts, an indication of success of said top-up request. For example, with regard to such means, said persistent storage device further stores in a non-transitory manner instructions which when loaded into said memory cause said at least one processor to be operative to: dispatch, from said electronic wallet server system, a request, to said entity associated with said corresponding ones of said funding payment card accounts, for top-up of said account associated with said corresponding one of said local card numbers, by said amount equal to said difference between said cost associated with said on-line shopping session of said given one of said consumers and said available amount in said account associated with said corresponding one of said local card numbers; and obtain, at said electronic wallet server system, from said entity associated with said corresponding ones of said funding payment card accounts, an indication of success of said top-up request.

Some embodiments of the electronic wallet server system further include means for obtaining, from an authentication service, an authentication value unique to a transaction associated with said on-line shopping session; and means for supplying said unique value to said e-commerce retailer. In such cases, said local card number preferably cannot be used for a purchase without said unique value. For example, with regard to such means, said persistent storage device further stores in a non-transitory manner instructions which when loaded into said memory cause said at least one processor to be operative to: obtain, from an authentication service, an authentication value unique to a transaction associated with said on-line shopping session; and supply said unique value to said e-commerce retailer.

Some embodiments of the electronic wallet server system further include means for obtaining, at said electronic wallet server system, an indication from said shipping merchant that at least one product associated with said on-line shopping session has arrived at said corresponding one of said local shipping addresses; means for dispatching, from said electronic wallet server system, an indication, destined for said given one of said consumers, that said at least one product associated with said on-line shopping session has arrived at said corresponding one of said local shipping addresses; and means for interacting with said given one of said consumers to obtain at least one direction associated with said at least one product. For example, with regard to such means, said persistent storage device further stores in a non-transitory manner instructions which when loaded into said memory cause said at least one processor to be operative to: obtain, at said electronic wallet server system, an indication from said shipping merchant that at least one product associated with said on-line shopping session has arrived at said corresponding one of said local shipping addresses; dispatch, from said electronic wallet server system, an indication, destined for said given one of said consumers, that said at least one product associated with said on-line shopping session has arrived at said corresponding one of said local shipping addresses; and interact with said given one of said consumers to obtain at least one direction associated with said at least one product.

Some embodiments of the electronic wallet server system further include means for obtaining said information via one of a browser using a secure socket layer and a secure hypertext transfer protocol uniform resource locator, and means for storing said registration information in an encrypted database accessible to said electronic wallet server but shielded from said e-commerce retailer. For example, with regard to such means, said persistent storage device further stores in a non-transitory manner instructions which when loaded into said memory cause said at least one processor to be operative to obtain said information via one of a browser using a secure socket layer and a secure hypertext transfer protocol uniform resource locator, and to store said registration information in an encrypted database accessible to said electronic wallet server but shielded from said e-commerce retailer.

The skilled artisan will appreciate that one or more embodiments of the invention solve one or more challenging technical problems.

One or more embodiments solve the technical problem of providing security in cross-border internet transactions. The consumer is protected from the risk of providing his or her actual account number to a merchant in a foreign country, where it may be difficult to pursue a fraudster. Instead, he or she provides the information to a trusted party, such as a well-known operator of a payment processing network like MasterCard International Incorporated, and the merchant only sees a local prepaid account number. The amount of money in the prepaid account is limited, and as explained with respect to FIG. 13, a unique authentication value prevents use of the local prepaid account number outside the system and prevents replay fraud. The consumer does not need to manually request and enter a "virtual" card number as in some prior art PAN-aliasing techniques. The consumer securely accesses the wallet via GUI 1477 and interfaces with the registration and account maintenance module 1483 (which also implements appropriate user provisioning functionality and maintenance/update functionality for already-created accounts). The initial consumer input, including provision of the consumer's home country card account details, can be carried out, for example, via a browser with an SSL or https URL with tunnel encryption between the browser and wallet platform. The data is preferably stored in database 1479 in encrypted form, and the keys are preferably stored in a FIPS 140-2 compliant device. The skilled artisan will appreciate that "FIPS" stands for the US Federal Information Processing Standards. FIPS 140-2 is expressly incorporated by reference herein in its entirety for all purposes. Skilled artisans such as application architects and/or developers in government, financial (e.g., payments processing) and/or health care sectors will be familiar with FIPS 140-2 in any case. Of course, if the laws, rules, or regulations of any other jurisdiction are applicable to database 1479, and any standard other than FIPS 140-2 is pertinent, the same should of course be fully complied with. It is believed that skilled artisans in jurisdictions outside the US will be able to select appropriate secure storage techniques applicable in their jurisdictions.

One or more embodiments solve the technical problem of automatically setting up a plurality of the local prepaid account numbers (PANs), for a plurality of different countries, based on rules in the e-wallet; such rules may be in computer code in Prepaid PAN assignment logic module

1481. Storage of these PANs results in a physical change in a digital database. In some cases, the rule is to simply generate prepaid PANs for all available jurisdictions, except the shopper's home country, at the time of initial registration. Other rules could be used in other cases; say, PANs could be generated for the top 10 (or other predetermined number) of countries other than the shopper's home country; or a menu of available countries can be presented to the user. When a new country becomes available after the consumer has already signed up, a PAN could automatically be generated or the consumer could be provided with a choice to obtain a number in the new country. This saves time and avoids possibly data entry errors, and reduces any dis-motivation that a shopper may have to participate in the system. The PANs come from prepaid card issuer 596 via interface 1471; module 1481 determines what countries to obtain PANs for in accordance with the pertinent rule(s).

One or more embodiments solve the technical problem of providing the shopper a seamless, real-time estimate, at check-out, of the fully landed costs for shipment to his or her home country, without the need to toggle back and forth between the merchant's web site and that of a logistics provider (shipping merchant). This reduces the amount of time required for shopping and reduces the chance of data entry errors.

It is worth noting at this point that in some cases, interaction between consumer 598 and retailer 895 is used to specify the desired form of shipping from the e-commerce retailer 895 to the shipping merchant 599. Retailer 895 then provides this information to wallet 597. Fully landed cost includes, inter alia, costs for shipment from warehouse of merchant 895 to shipping merchant's warehouse 599, as well as costs for shipping from the shipping merchant's warehouse 599 to the consumer's physical address in his or her home country. However, retailer 895 typically does not care how shipment occurs from the shipping merchant's warehouse 599 to the consumer's physical address in his or her home country. Thus, in some cases, the wallet 597 obtains product information and local shipping information from e-commerce retailer 895. In some instances, the actual shipment from shipping merchant 599 to the consumer's physical address in his or her home country happens once it is known that the goods have been shipped from retailer 895 to warehouse 599. In some cases, the steps discussed just above are directed to an estimate for shipment from shipping merchant 599 to the consumer's physical address in his or her home country, used to develop an estimated fully landed cost. For purposes of estimating the fully landed cost, in a non-limiting example, consumer 598 interacts directly with wallet 597 via user interface 1477 or the like, to indicate how he or she wants the goods shipped to his or her home country from shipping merchant 599. As noted, however, in some cases the retailer 895 acts as an intermediary.

Yet another step includes dispatching, from the electronic wallet server, an indication, destined for the given one of the consumers, of an estimated fully landed cost associated with the on-line shopping session. The estimated fully landed cost is based at least upon the product information, the indication of the desired form of shipping from the e-commerce retailer to the corresponding one of the local shipping addresses, and the indication of the desired form of shipping from the corresponding one of the local shipping addresses to the corresponding one of the physical addresses in the at least one country other than the first country. This step may be carried out, for example, via user interface 1477 or the like (e.g., GUI 1477 serves HTML code to the consumer's machine that causes another window to pop up thereon); however, in some cases the retailer 895 acts as an intermediary.

An additional step includes dispatching, from the electronic wallet server 597, shipping option information, destined for the given one of the consumers 598. The shipping option information provides at least two options for one or both of the shipments, i.e., the shipment from the e-commerce retailer to the corresponding one of the local shipping addresses, and the shipment from the corresponding one of the local shipping addresses to the corresponding one of the physical addresses in the at least one country other than the first country.

The indication of the desired form of shipping from the e-commerce retailer to the corresponding one of the local shipping addresses, or the indication of the desired form of shipping from the corresponding one of the local shipping addresses to the corresponding one of the physical addresses in the at least one country other than the first country, or both, as the case may be, is responsive to the shipping option information.

In one or more embodiments, the shipping option information includes at least one of cost and speed information for each of the at least two options.

System and Article of Manufacture Details

Embodiments of the invention can employ hardware and/or hardware and software aspects. Software includes but is not limited to firmware, resident software, microcode, etc. Software might be employed, for example, in connection with one or more of a terminal 122, 124, 125, 126; a reader 132; payment devices such as cards 102, 112; a host, server, and/or processing center 140, 142, 144 (optionally with data warehouse 154) of a merchant, issuer, acquirer, processor, or operator of a network 2008 operating according to a payment system standard (and/or specification), as well as blocks 597, 1477, 1475, 1479, 1469, 1471, 1473 of FIG. 14. Firmware might be employed, for example, in connection with payment devices such as cards 102, 112 and reader 132. Firmware provides a number of basic functions (e.g., display, print, accept keystrokes) that in themselves do not provide the final end-use application, but rather are building blocks; software links the building blocks together to deliver a usable solution.

FIG. 12 is a block diagram of a system 1200 that can implement part or all of one or more aspects or processes of the invention. As shown in FIG. 12, memory 1230 configures the processor 1220 (which could correspond, e.g., to processor portions 106, 116, 130; processors of remote hosts in centers 140, 142, 144; processors of servers implementing blocks 597, 1477, 1475, 1479, 1469, 1471, 1473 of FIG. 14, and the like) to implement one or more aspects of the methods, steps, and functions disclosed herein (collectively, shown as process 1280 in FIG. 12). Different method steps can be performed by different processors. The memory 1230 could be distributed or local and the processor 1220 could be distributed or singular. The memory 1230 could be implemented as an electrical, magnetic or optical memory, or any combination of these or other types of storage devices (including memory portions as described above with respect to cards 102, 112). It should be noted that if distributed processors are employed, each distributed processor that makes up processor 1220 generally contains its own addressable memory space. It should also be noted that some or all of computer system 1200 can be incorporated into an application-specific or general-use integrated circuit. For example, one or more method steps could be implemented in hardware in an ASIC rather than using firmware. Display 1240 is representative of a variety of possible input/output devices (e.g., displays, mice, keyboards, and the like).

The notation "to/from network" is indicative of a variety of possible network interface devices.

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). For example, one device could be a physical memory media associated with a terminal and another device could be a physical memory media associated with a processing center. As used herein, a tangible computer-readable recordable storage medium is intended to encompass a non-transitory recordable medium, examples of which are set forth above, but is not intended to encompass a transmission medium or disembodied signal.

The computer systems and servers described herein each contain a memory that will configure associated processors to implement the methods, steps, and functions disclosed herein. Such methods, steps, and functions can be carried out, by way of example and not limitation, by processing capability on elements 140, 142, 144, 597 (i.e., physical machine(s) on which e-wallet platform and its associated interface and/or database modules run), 2004, 2006, 2008, 2010, or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the invention, such as, for example, 140, 142, 144, blocks 597, 1477, 1475, 1479, 1469, 1471, 1473, 1481, 1483, 1485 of FIG. 14, 2004, 2006, 2008, 2010 can make use of computer technology with appropriate instructions to implement method steps described herein. The various platforms can be implemented, for example, using one or more servers which include a memory and at least one processor coupled to the memory. The memory could load appropriate software. The processor can be operative to perform one or more method steps described herein or otherwise facilitate their performance.

Accordingly, it will be appreciated that one or more embodiments of the invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 1200 as shown in FIG. 12) running a server program. It will be understood that such a physical server may or may not include a display, keyboard, or other input/output components. A "host" includes a physical data processing system (for example, system 1200 as shown in FIG. 12) running an appropriate program. It will be understood that such a host may or may not include a display, keyboard, or other input/output components.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. In one or more embodiments, the modules include an electronic wallet platform module to implement block 597, and any one, some, or all of a user interface module to implement block 1477, a shipping merchant interface module to implement block 1475, a database module to implement block 1479, a balance inquiry service module to implement block 1469; a prepaid card issuer interface module to implement block 1471, an e-commerce retailer interface module to implement block 1473, a prepaid PAN assignment logic module to implement block 1481, a registration and account maintenance module to implement block 1483, and an authentication service interface module to implement block 1485. The blocks may be implemented by the software modules together with corresponding memories and one or more processors. The modules can run, for example on one or more hardware processors of one or more e-wallet servers; in general, all could run on the same server, each could run on a separate server, and so on. Block 1479, in some instances, could run on one or more database servers. In a preferred but non-limiting approach, element 597 includes a software platform while the interface modules include code to carry out the indicated functionality as well as any required translation functionality to interface with the external systems. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Computers discussed herein can be interconnected, for example, by one or more of network 138, 2008, another virtual private network (VPN), the Internet, a local area and/or wide area network (LAN and/or WAN), via an EDI layer, and so on. The computers can be programmed, for example, in compiled, interpreted, object-oriented, assembly, and/or machine languages, for example, one or more of C, C++, Java, Visual Basic, JavaScript or other ECMAScript based scripting languages, and the like (an exemplary and non-limiting list), and can also make use of, for example, Extensible Markup Language (XML), JSON, name/value pairs, known application programs such as relational database applications, spreadsheets, and the like. The computers can be programmed to implement the logic depicted in the flow charts and other figures. At least some messages, in at least some instances, can be in accordance with ISO 8583.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
obtaining, at an electronic wallet server, in connection with an on-line shopping session of a consumer at an e-commerce retailer, a request, from said e-commerce retailer, for a shipping address assigned to said consumer;
supplying, by said electronic wallet server, a local shipping address of said consumer to said e-commerce retailer in response to said request therefor, wherein said local shipping address is selected by said electronic wallet server from among a plurality of addresses corresponding to said consumer including a foreign address, and wherein said local shipping address is located in a same jurisdiction as said e-commerce retailer;
obtaining, at said electronic wallet server, in connection with said on-line shopping session of said consumer at said e-commerce retailer, product information and an indication of a desired form of shipping from said e-commerce retailer to said local shipping address;
obtaining, at said electronic wallet server, in connection with said on-line shopping session of said consumer at said e-commerce retailer, an indication of a desired form of shipping from said local shipping address to said foreign address; and
dispatching, from said electronic wallet server, an indication, destined for said consumer, of an estimated fully landed cost associated with said on-line shopping session, said estimated fully landed cost being determined using said product information, said indication of said desired form of shipping from said e-commerce retailer to said local shipping address, and said indication of said desired form of shipping from said local shipping address to said foreign address.

2. The method of claim 1, further comprising obtaining, at said electronic wallet server, from said consumer, registration information, said registration information comprising at least a consumer name, said foreign address, and funding payment card account information.

3. The method of claim 2, further comprising:
dispatching, from said electronic wallet server, to a shipping merchant, said product information and said indication of said desired form of shipping from said local shipping address to said foreign address; and
obtaining, at said electronic wallet server, from said shipping merchant, a shipping cost from said local shipping address to said foreign address, and associated governmental fees,
wherein said indication of said estimated fully landed cost is based on said shipping cost and said associated governmental fees obtained at said electronic wallet server from said shipping merchant.

4. The method of claim 2, further comprising:
dispatching a request, from said electronic wallet server, to a card issuer, for a local card number of said consumer for said jurisdiction; and
obtaining, by said electronic wallet server, from said card issuer, said local card number.

5. The method of claim 4, further comprising linking said local card number for said jurisdiction to said funding payment card account information.

6. The method of claim 5, further comprising:
obtaining, at said electronic wallet server, in connection with said on-line shopping session of said consumer at said e-commerce retailer, a request, from said e-commerce retailer, for payment information; and
supplying said payment information to said e-commerce retailer in response to said request therefor, said payment information comprising said local card number.

7. The method of claim 6, further comprising:
said electronic wallet server communicating with an entity associated with said funding payment card account information to initiate a funding account purchase for an amount equal to a difference between a cost associated with said on-line shopping session of said consumer and an available amount in an account associated with said local card number.

8. The method of claim 7, further comprising:
dispatching, from said electronic wallet server, a request, to said entity associated with said funding payment card account information, for top-up of said account associated with said local card number, by said amount equal to said difference between said cost associated with said on-line shopping session of said consumer and said available amount in said account associated with said local card number; and
obtaining, at said electronic wallet server, from said entity associated with said funding payment card account information, an indication of success of said top-up request.

9. The method of claim 8, further comprising:
said electronic wallet server obtaining, from an authentication service, an authentication value unique to a transaction associated with said on-line shopping session; and
said electronic wallet server supplying said unique value to said e-commerce retailer,
wherein said local card number cannot be used for a purchase without said unique value.

10. The method of claim 2, further comprising:
obtaining, at said electronic wallet server, an indication from a shipping merchant that at least one product associated with said on-line shopping session has arrived at said local shipping address;
dispatching, from said electronic wallet server, an indication, destined for said consumer, that said at least one product associated with said on-line shopping session has arrived at said local shipping address; and
interacting with said consumer to obtain at least one direction associated with said at least one product.

11. The method of claim 2, wherein said obtaining of said registration information comprises obtaining said registration information via one of a browser using a secure socket layer and a secure hypertext transfer protocol uniform resource locator, further comprising storing said registration information in an encrypted database accessible to said electronic wallet server and shielded from said e-commerce retailer.

12. The method of claim 1, further comprising providing a system, wherein said system comprises distinct software modules, each of said distinct software modules being embodied on at least one non-transitory computer readable recordable storage medium, and wherein said distinct software modules comprise an electronic wallet platform module, a user interface module, a shipping merchant interface module, a database module, and an e-commerce retailer interface module;
wherein:
said steps of obtaining said request and supplying said local shipping address are carried out by said e-commerce retailer interface module, interacting with said database module executing together with said electronic wallet platform module on at least a first hardware processor;
said step of obtaining said product information and said indication of said desired form of shipping from said e-commerce retailer to said local shipping address is carried out by at least one of said e-commerce retailer interface module and said user interface module, executing together with said electronic wallet platform module on said at least first hardware processor;
said step of obtaining said indication of said desired form of shipping from said local shipping address to said foreign address is carried out by at least one of said e-commerce retailer interface module and said user interface module, executing together with said electronic wallet platform module on said at least first hardware processor; and
said step of dispatching said indication of said estimated fully landed cost is carried out by at least one of said e-commerce retailer interface module and said user interface module, executing together with said electronic wallet platform module on said at least first hardware processor.

13. The method of claim 1, further comprising:
dispatching, from said electronic wallet server, shipping option information, destined for said consumer, providing at least two options for at least one of:
said shipping from said e-commerce retailer to said local shipping address, and
said shipping from said local shipping address to said foreign address;
wherein at least one of:
said indication of said desired form of shipping from said e-commerce retailer to said local shipping address, and
said indication of said desired form of shipping from said local shipping address to said foreign address,
is responsive to said shipping option information.

14. The method of claim 13, wherein, in said step of dispatching said shipping option information, said shipping option information comprises at least one of cost and speed information for each of said at least two options.

15. An electronic wallet server system comprising:
a memory;
at least one processor operatively coupled to said memory; and
a persistent storage device operatively coupled to said memory and storing in a non-transitory manner instructions which when loaded into said memory cause said at least one processor to be operative to:
obtain, at said electronic wallet server system, in connection with an on-line shopping session of a consumer at an e-commerce retailer, a request, from said e-commerce retailer, for a shipping address assigned to said consumer;
supply, by said electronic wallet server system, a local shipping address of said consumer to said e-commerce retailer in response to said request therefor, wherein said local shipping address is selected from among a plurality of addresses corresponding to said consumer including a foreign address, and wherein said local shipping address is located in a same jurisdiction as said e-commerce retailer;
obtain, at said electronic wallet server system, in connection with said on-line shopping session of said consumer at said e-commerce retailer, product information and an indication of a desired form of shipping from said e-commerce retailer to said local shipping address;
obtain, at said electronic wallet server system, in connection with said on-line shopping session of said consumer at said e-commerce retailer, an indication of a desired form of shipping from said local shipping address to said foreign address; and
dispatch, from said electronic wallet server system, an indication, destined for said consumer, of an estimated fully landed cost associated with said on-line shopping session, said estimated fully landed cost being determined using said product information, said indication of said desired form of shipping from said e-commerce retailer to said local shipping address, and said indication of said desired form of shipping from said local shipping address to said foreign address.

16. The electronic wallet server system of claim 15, wherein said persistent storage device further stores in a non-transitory manner instructions which when loaded into said memory cause said at least one processor to be operative to obtain, at said electronic wallet server system, from said consumer, registration information, said registration information comprising at least a consumer name, said foreign address, and funding payment card account information.

17. The electronic wallet server system of claim 16, wherein said persistent storage device further stores in a non-transitory manner instructions which when loaded into said memory cause said at least one processor to be operative to:
dispatch, from said electronic wallet server system, to a shipping merchant, said product information and said indication of said desired form of shipping from said local shipping address to said foreign address; and
obtain, at said electronic wallet server system, from said shipping merchant, a shipping cost from said local shipping address to said foreign address, and associated governmental fees,
wherein said indication of said estimated fully landed cost is based on said shipping cost and said associated governmental fees obtained at said electronic wallet server system from said shipping merchant.

18. The electronic wallet server system of claim 16, wherein said persistent storage device further stores in a non-transitory manner instructions which when loaded into said memory cause said at least one processor to be operative to:
dispatch a request, from said electronic wallet server system, to a card issuer, for a local card number of said consumer for said jurisdiction; and
obtain, by said electronic wallet server system, from said card issuer, said local card number.

19. The electronic wallet server system of claim 16, wherein said persistent storage device further stores in a non-transitory manner instructions which when loaded into said memory cause said at least one processor to be operative to:
obtain, at said electronic wallet server system, an indication from a shipping merchant that at least one product associated with said on-line shopping session has arrived at said local shipping address;

dispatch, from said electronic wallet server system, an indication, destined for said consumer, that said at least one product associated with said on-line shopping session has arrived at said local shipping address; and interact with said consumer to obtain at least one direction associated with said at least one product.

20. The electronic wallet server system of claim 16, wherein said persistent storage device further stores in a non-transitory manner instructions which when loaded into said memory cause said at least one processor to be operative to obtain said registration information via one of a browser using a secure socket layer and a secure hypertext transfer protocol uniform resource locator, and to store said registration information in an encrypted database accessible to said electronic wallet server and shielded from said e-commerce retailer.

21. The electronic wallet server system of claim 15, wherein said instructions on said persistent storage device comprise distinct software modules, and wherein said distinct software modules comprise an electronic wallet platform module, a user interface module, a shipping merchant interface module, a database module, and an e-commerce retailer interface module;

wherein:
said e-commerce retailer interface module, interacting with said database module, comprise said instructions which cause said at least one processor to obtain said request and to supply said local shipping address;

at least one of said e-commerce retailer interface module and said user interface module, executing together with said electronic wallet platform module, comprise said instructions which cause said at least one processor to:
obtain said product information and said indication of said desired form of shipping from said e-commerce retailer to said local shipping address;
obtain said indication of said desired form of shipping from said local shipping address to said foreign address; and
dispatch said indication of said estimated fully landed cost.

22. The electronic wallet server system of claim 18, wherein said persistent storage device further stores in a non-transitory manner instructions which when loaded into said memory cause said at least one processor to be operative to: link said local card number for said jurisdiction to said funding payment card account information.

23. The electronic wallet server system of claim 22, wherein said persistent storage device further stores in a non-transitory manner instructions which when loaded into said memory cause said at least one processor to be operative to:
obtain, at said electronic wallet server system, in connection with said on-line shopping session of said consumer at said e-commerce retailer, a request, from said e-commerce retailer, for payment information; and
supply said payment information to said e-commerce retailer in response to said request therefor, said payment information comprising said local card number.

24. The electronic wallet server system of claim 23, wherein said persistent storage device further stores in a non-transitory manner instructions which when loaded into said memory cause said at least one processor to be operative to:
cause said electronic wallet server system to communicate with an entity associated with said funding payment card account information to initiate a funding account purchase for an amount equal to a difference between a cost associated with said on-line shopping session of said consumer and an available amount in an account associated with said local card number.

25. The electronic wallet server system of claim 24, wherein said persistent storage device further stores in a non-transitory manner instructions which when loaded into said memory cause said at least one processor to be operative to:
dispatch, from said electronic wallet server system, a request, to said entity associated with said funding payment card account information, for top-up of said account associated with said local card number, by said amount equal to said difference between said cost associated with said on-line shopping session of said consumer and said available amount in said account associated with said local card number; and
obtain, at said electronic wallet server system, from said entity associated with said funding payment card account information, an indication of success of said top-up request.

26. The electronic wallet server system of claim 25, wherein said persistent storage device further stores in a non-transitory manner instructions which when loaded into said memory cause said at least one processor to be operative to:
obtain, from an authentication service, an authentication value unique to a transaction associated with said on-line shopping session; and
supply said unique value to said e-commerce retailer, wherein said local card number cannot be used for a purchase without said unique value.

27. An apparatus comprising:
means for obtaining, at an electronic wallet server, in connection with an on-line shopping session of a consumer at an e-commerce retailer, a request, from said e-commerce retailer, for a shipping address assigned to said consumer;
means for supplying, by said electronic wallet server, a local shipping address of said consumer to said e-commerce retailer in response to said request therefor, wherein said local shipping address is selected from among a plurality of addresses corresponding to said consumer including a foreign address, and wherein said local shipping address is located in a same jurisdiction as said e-commerce retailer;
means for obtaining, at said electronic wallet server, in connection with said on-line shopping session of said consumer at said e-commerce retailer, product information and an indication of a desired form of shipping from said e-commerce retailer to said local shipping address;
means for obtaining, at said electronic wallet server, in connection with said on-line shopping session of said consumer at said e-commerce retailer, an indication of a desired form of shipping from said local shipping address to said foreign address; and
means for dispatching, from said electronic wallet server, an indication, destined for said consumer, of an estimated fully landed cost associated with said on-line shopping session, said estimated fully landed cost being determined using said product information, said indication of said desired form of shipping from said e-commerce retailer to said local shipping address, and said indication of said desired form of shipping from said local shipping address to said foreign address.

28. An article of manufacture comprising a computer program product, said computer program product comprising:

a tangible computer-readable recordable storage medium, storing in a non-transitory manner computer readable program code, the computer readable program code comprising:

computer readable program code configured to obtain, at an electronic wallet server, in connection with an on-line shopping session of a consumer at an e-commerce retailer, a request, from said e-commerce retailer, for a shipping address assigned to said consumer;

computer readable program code configured to supply, by said electronic wallet server, a local shipping address of said consumer to said e-commerce retailer in response to said request therefor, wherein said local shipping address is selected from among a plurality of addresses corresponding to said consumer including a foreign address, and wherein said local shipping address is located in a same jurisdiction as said e-commerce retailer;

computer readable program code configured to obtain, at said electronic wallet server, in connection with said on-line shopping session of said consumer at said e-commerce retailer, product information and an indication of a desired form of shipping from said e-commerce retailer to said local shipping address;

computer readable program code configured to obtain, at said electronic wallet server, in connection with said on-line shopping session of said consumer at said e-commerce retailer, an indication of a desired form of shipping from said local shipping address to said foreign address; and computer readable program code configured to dispatch, from said electronic wallet server, an indication, destined for said consumer, of an estimated fully landed cost associated with said on-line shopping session, said estimated fully landed cost being determined using said product information, said indication of said desired form of shipping from said e-commerce retailer to said local shipping address, and said indication of said desired form of shipping from said local shipping address to said foreign address.

* * * * *